(12) United States Patent
Rajkowski

(10) Patent No.: US 7,038,659 B2
(45) Date of Patent: May 2, 2006

(54) SYMBOL ENCODING APPARATUS AND METHOD

(76) Inventor: Janusz Wiktor Rajkowski, 1012 Spruce St., Collingdale, PA (US) 19023

( * ) Notice: Subject to any disclaimer, the term of this patent is extended or adjusted under 35 U.S.C. 154(b) by 260 days.

(21) Appl. No.: 10/393,421

(22) Filed: Mar. 20, 2003

(65) Prior Publication Data

US 2004/0021633 A1   Feb. 5, 2004

Related U.S. Application Data

(60) Provisional application No. 60/370,278, filed on Apr. 6, 2002.

(51) Int. Cl.
*G09G 5/00* (2006.01)
(52) U.S. Cl. ...................... 345/156; 345/173
(58) Field of Classification Search ............... 345/156, 345/157, 158, 161, 163, 168, 169, 184, 173, 345/358, 171, 160, 165, 166
See application file for complete search history.

(56) References Cited

U.S. PATENT DOCUMENTS

| | | | |
|---|---|---|---|
| 4,701,747 A | 10/1987 | Isherwood et al. | |
| 4,713,535 A | 12/1987 | Rhoades | 250/221 |
| 4,812,833 A | 3/1989 | Shimauchi | 345/175 |
| 4,846,598 A | 7/1989 | Livits | 400/472 |
| 4,905,001 A | 2/1990 | Penner | 341/20 |
| 4,905,007 A | 2/1990 | Rohm | 341/173 |
| 4,913,573 A | 4/1990 | Retter | |
| 4,971,465 A | 11/1990 | Hashimoto | 400/485 |
| 5,194,862 A | 3/1993 | Edwards | |
| 5,305,017 A | 4/1994 | Gerpheide | |
| 5,463,388 A | 10/1995 | Boie et al. | |
| 5,486,058 A | 1/1996 | Allen | 400/485 |
| 5,543,591 A | 8/1996 | Gillespie et al. | |
| 5,581,276 A * | 12/1996 | Cipolla et al. | 345/156 |
| 5,707,160 A | 1/1998 | Bowen | 400/472 |
| 5,796,406 A | 8/1998 | Shigematsu et al. | 345/863 |
| 5,825,352 A * | 10/1998 | Bisset et al. | 345/173 |
| 5,825,353 A * | 10/1998 | Will | 345/184 |
| 5,841,078 A | 11/1998 | Miller et al. | |
| 5,844,506 A | 12/1998 | Binstead | |
| 5,856,824 A | 1/1999 | Shieh | 345/173 |
| 5,874,942 A * | 2/1999 | Walker | 345/158 |
| 5,880,411 A | 3/1999 | Gillespie et al. | |
| 5,917,476 A | 6/1999 | Czerniecki | 345/173 |
| 5,977,938 A | 11/1999 | Iwasa | 345/32 |
| 6,094,197 A * | 7/2000 | Buxton et al. | 715/863 |
| 6,097,374 A | 8/2000 | Howard | 345/168 |
| 6,180,936 B1 | 1/2001 | Haft | 250/214.1 |

(Continued)

OTHER PUBLICATIONS

"The Invisible Keyboard," Popular Science magazine, New York, New York, USA, Feb. 2002, p. 16.

(Continued)

*Primary Examiner*—Vijay Shankar
*Assistant Examiner*—Nitin Patel
(74) *Attorney, Agent, or Firm*—Robert J. Yarbrough

(57) ABSTRACT

An apparatus and method of encoding and communicating symbols is provided. A user encodes a symbol using a sliding motion of a fingertip in relation to a proximity and touch-detecting glance pad. The user imagines a polygon on the surface of the pad. The user makes an encoding touch generally coextensive with one of the sides of the polygon in either a clockwise or counterclockwise direction. The glance pad detects the motion and infers the intent of the user, assigning a symbol to the encoding touch.

47 Claims, 25 Drawing Sheets

U.S. PATENT DOCUMENTS

| | | |
|---|---|---|
| 6,249,606 B1 | 6/2001 | Kiraly et al. ............... 382/195 |
| 6,304,840 B1 | 10/2001 | Vance et al. |
| 6,313,825 B1 | 11/2001 | Gilbert ....................... 345/156 |
| 6,323,846 B1 | 11/2001 | Westerman et al. |
| 6,333,734 B1 | 12/2001 | Rein .......................... 345/169 |
| 6,366,697 B1 | 4/2002 | Goldberg et al. ........... 382/186 |
| 6,407,679 B1 | 6/2002 | Evans et al. .................. 341/20 |
| 6,590,566 B1 * | 7/2003 | Abe ........................... 345/168 |
| 6,728,395 B1 * | 4/2004 | Kage et al. ................. 382/107 |
| 2002/0015024 A1 | 2/2002 | Westerman |
| 2004/0108994 A1 * | 6/2004 | Kato ........................... 345/171 |

OTHER PUBLICATIONS

"Virtual Devices' Virtual Keyboard, the V-Key", advertisement Virtual Devices, 2661 Clearview Dr., Allison Park, PA USA 15101.

* cited by examiner

A

B

C

D g l a n c e

SYMBOL ENCODING APPARATUS AND METHOD

RELATED APPLICATIONS

This application is related to and claims priority from provisional patent application No. 60/370,278 filed by Janusz Wiktor Rajkowski on Apr. 6, 2002.

BACKGROUND

1. Field of the Invention

The present Invention relates to a method and apparatus for inputting or communication of symbols, such as alphanumeric characters, using a motion and touch detecting surface.

2. Description of the Related Art

The human mind communicates with the world through the muscular contractions that result in speech and gestures. The human hand is capable of precise, complex motion and has great potential as a means of communication.

Previous attempts to exploit hand motion as a mode of communication have resulted in methods that are relatively slow and cumbersome. The typewriter was the first successful mechanical device using hand movements to communicate complex thoughts. The design of the familiar typewriter keyboard was constrained by mechanical considerations. With the advent of computers, the mechanical considerations disappeared, but the typewriter keyboard remained. A modified typewriter keyboard was combined with a computer mouse and adopted as the human-to-machine interface of choice. No subsequent challenges compromised the dominant role of the keyboard/mouse combination.

There are two reasons for the lasting appeal of the familiar typewriter keyboard. First, the keyboard may be used by an untrained operator and typing skills may be acquired gradually. Second, a skilled typist may produce text very rapidly. To achieve a high rate of typing speed, the skilled typist utilizes the propensity of the brain for parallel processing in which separate neural networks control the motion of each finger. As the typist learns to type, combinations of movements become preprogrammed sequences of neural commands. As the skilled typist works, the preprogrammed movements are stacked in the brain circuits ready for subsequent subconscious execution. By distributing the work load between the two hands and among the ten fingers, the skilled typist may produce text at a speed matching the pace of casual speech.

The typewriter keyboard has several disadvantages. First, a full-size keyboard suitable for high-speed operation is bulky and not easily transported. Second, the keyboard must be operated with both hands to achieve speed and accuracy. Third, the typist must conform his or her posture to the requirements of the keyboard; namely, sitting or standing facing the keyboard with the keyboard at the proper height and angle.

Several improvements to the typewriter keyboard have been proposed. Among the most notable is the chorded keyboard. The user of a chorded keyboard strikes multiple keys using multiple fingers at one time to enter a single character. The advantage of the chorded keyboard is that far fewer keys are needed, allowing the chorded keyboard to be used with one hand. A chorded keyboard may be hand-mounted or hand-held and may be operated away from the desk. Chorded keyboards require complex encoding schemes and complex, multidimensional, multi-joint finger motions and require a return to a resting position following each encoding motion. As a result, chorded keyboards can be operated only at a low speed, even by a skilled operator.

Virtual keyboards are available and are smaller and less obtrusive than the bulky physical keyboard. Virtual keyboards emulate typewriter keyboard operation, including the typewriter keyboard layout. Virtual keyboards employ remote sensing technologies to track finger motions with finger motion tracking devices placed in front of the keyboard or mounted on the hand. The user performs the hand movements of typing on a tabletop and the motion tracking devices translate the finger motions into the keystrokes of a typewriter.

Virtual keyboards share many of the disadvantages of the physical keyboard; namely, a tabletop area is required for operation, the operator must adopt a posture in front of the virtual keyboard, and the operator must type using two hands to achieve rapid operation. An additional disadvantage of the virtual keyboard is the lack of tactile feedback to the user.

Patents related to virtual keyboard technology include U.S. Pat. No. 6,304,840 to Vance issued Oct. 1, 2001 entitled "Fingerless glove for interacting with data processing system" and U.S. Pat. No. 5,767,842 to Koch, issued Jun. 16, 1998, entitled "Method and device for optical input of commands or data." Virtual keyboard devices are marketed by Samsung Scurry and may be seen on the company website at www.samsung.com. Another virtual keyboard device is marketed by Senseboard Technologies and can be viewed on the company website at www.senseboard.com. The company 'Virtual Devices' also markets a virtual keyboard.

Prior art devices for sign language gesture recognition are based on similar principles and provide for free space hand motion tracking.

Touch sensitive tablets or display overlays also have been developed. Touch sensitive tablets may use a typewriter keyboard layout or a chorded keyboard layout and may add enhancements unavailable in a physical keyboard, mostly through integrating the functions of a keyboard and of a cursor positioning device.

Several touch-sensing and proximity detection technologies are well known in the art; among those technologies are membrane or mechanical switches, resistive membranes, acoustic, capacitive, inductive and optical sensors. Many of these devices use a row and column grid of intersecting conductors or similarly arranged matrix of individual sensing elements. Capacitive sensing technology is among the most popular because it is capable of sensing the presence of a finger up to several millimeters away from a sensing device ("proximity sensing"). Capacitive sensing technology allows for zero-force, virtually touchless data entry or manipulation of an object on a screen.

Several multi-finger contact detectors have been proposed. Most are based on capacitive sensing technology. Multi-finger contact detectors are capable of detecting multi-finger-coordinated gestures and are designed for manipulative interactions with complex applications. Examples of such multi-finger contact detectors are as follows:

S. Lee, "A Fast Multiple-Touch-Sensitive Input Device", University of Toronto Master's Thesis (1984);

U.S. Pat. No. 5,194,862 to Edwards issued Mar. 16, 1993 entitled "Touch sensor array systems and display systems incorporating such";

U.S. Pat. No. 5,463,388 to Boie issued Oct. 31, 1995, "Computer mouse or keyboard input device utilizing capacitive sensors";

U.S. Pat. No. 5,844,506 to Binstead issued Dec. 1, 1998 and entitled "Multiple input proximity detector and touchpad system"; and U.S. Pat. No. 5,825,352 to Bisset issued on Oct. 20, 1998, entitled "Multiple finger contact sensing method for emulating mouse buttons and mouse operations on a touch sensor pad".

Additional developments have been directed to integrate different types of manual input. Typing, manipulation and handwriting capacities are taught by U.S. Pat. No. 6,323,846 to Westerman issued on Nov. 27, 2001, entitled "Method and apparatus for integrating manual input."

Each of the prior art approaches reviewed above has one or more of the following disadvantages:

(a) the approach requires conformation to the posture required by the keyboard (typewriter keyboard, virtual keyboard);

(b) the approach does not provide good tactile feedback (virtual keyboard).

(c) the approach involves complex multi-joint, unnatural motions, resulting in slow output (chorded keyboards);

(d) the approach requires forceful, large-amplitude hand 12 motions followed by wasted motion to the neutral resting position (chorded keyboard);

The apparatus and method of the present Invention overcome the foregoing disadvantages of the prior art.

SUMMARY OF THE INVENTION

The present Invention is a method and apparatus for communication, particularly for inputting symbols into a computer or communication device. The method of the invention comprises moving a finger or other object to encode an information item. Such motion by a finger or other object is referred to herein as a "glance." The apparatus of the invention is a "glance pad" (as hereinafter defined) that detects the finger motion coupled with associated processing apparatus that interprets the finger motion.

From the perspective of the user, each 'glance' is a sliding touch by a fingertip or by the pad of the terminal joint of a finger against a glance pad, the touch being along one of the sides of a rectangle assigned to that finger. The sliding touch has location and direction. In making a glance, the user selects a finger to make the glance, selects one of the four sides of the rectangle assigned to that finger, and selects one of the two possible directions of motion (clockwise and counterclockwise with respect to the rectangle) along the selected side. Each finger therefore can produce eight different "glance motions" and can encode at least eight different symbols. Four fingers of one hand can encode more than the twenty-six letters of the alphabet.

The rectangle of the foregoing description is not a physical object. The rectangle is imaginary and exists only as a conceptual aid for the user. From the perspective of the user, each rectangle moves with the finger to which the rectangle is assigned so that the user may reach for the imaginary side of the imaginary rectangle from any position of the user's fingers on the glance pad.

From the perspective of the glance pad and invention apparatus, each glance has two components: a "proximity component," also called an "approach trajectory," and an "encoding touch." The encoding touch is the sliding touch by a finger of the user to the glance pad. The direction of motion of the finger immediately prior to and immediately after the start of the encoding touch defines a 'touch vector.' The motion of the finger beginning at a predetermined time prior to the start of the encoding touch and ending at a predetermined time with respect to the start of the encoding touch defines an 'approach vector.' Together, the approach vector and the touch vector reveal which of the eight different possible glance motions the user intended. The apparatus consults a library of symbols and selects the symbol encoded by the particular glance motion intended by the user.

The apparatus employs various strategies to screen data received to eliminate spurious data and to interpret ambiguous or incomplete information generated by a finger motion. Those strategies include evaluating the simultaneous motion of more than one finger to infer the motion of the finger making an encoding touch.

The glance pad of the invention is a proximity and touch-sensing device using any of the suitable conventional technologies known in the art, including technologies based on light, capacitance, inductance, acoustic energy, mechanical switches or any other suitable technology or combination of technologies capable of detecting the presence and spatial arrangement of a plurality of objects, especially fingers of a user, on or near the sensing surface. The sensing device comprises an array of proximity and touch sensing nodes coupled to a microprocessor and further includes appropriate software controlling the microprocessor. The microprocessor and software interpret data generated by the proximity sensing nodes and select an encoded symbol from a library of symbols contained in memory. The apparatus generates an output signal, encoding and communicating the selected symbol.

The information item encoded by a glance can be an alphanumeric character, word, number, executable computer program, or group of characters, words or numbers, or any other item of information. As used in this application, the term "symbol" means any item of information of any nature capable of being assigned to a particular glance, but does not include information to determine the location of a cursor on a computer screen.

As used in this application, the term "glances" means the glancing motion of a finger acting in concert with and cooperating with the glancing motions of other fingers. The activity of encoding a symbol is referred to herein as "glancing."

BRIEF DESCRIPTION OF THE DRAWINGS

FIG. 14A is a top view of the apparatus.

FIG. 14B illustrates a method of identifying activated photocells in the X and Y dimensions.

DESCRIPTION OF AN EMBODIMENT

Figure 1:
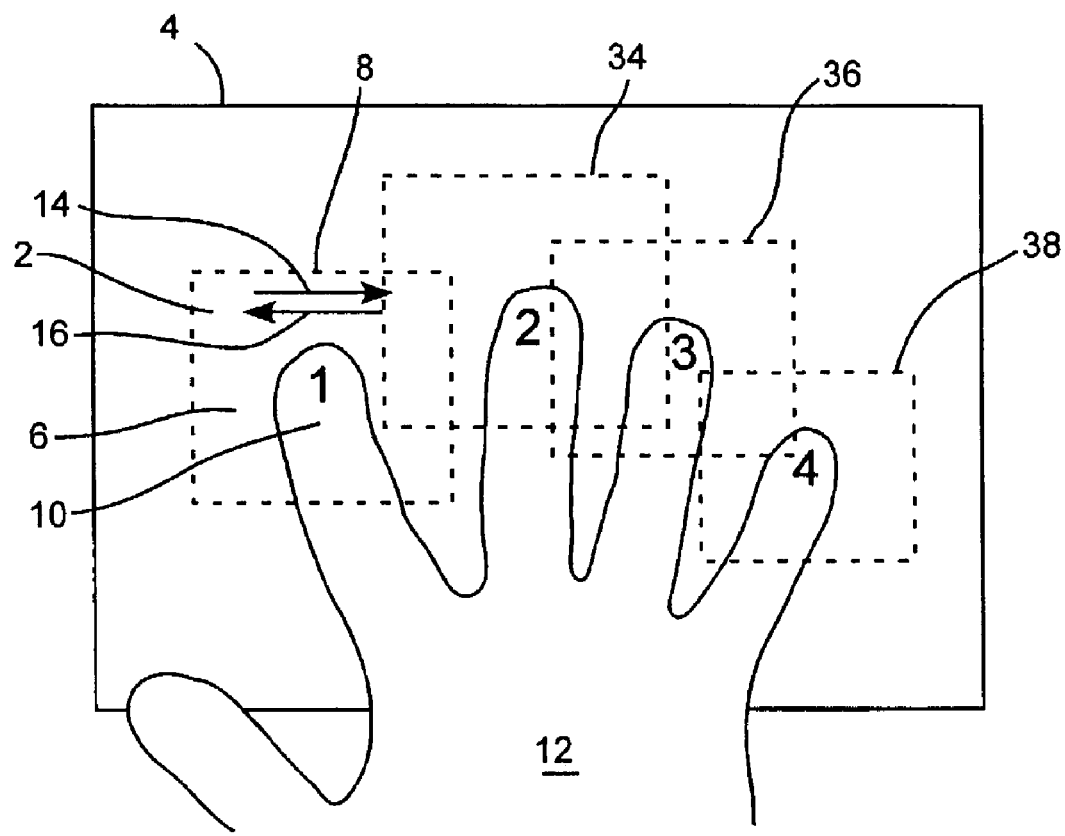
FIG. 1 is a schematic diagram of the apparatus and method of the invention.

As shown by FIG. 1, to encode a symbol using the method of the Invention, a user imagines a polygon 2 appearing on the surface of a glance pad 4. The polygon 2 is imaginary and is not a physical object. The purpose of imagining the polygon 2 is to assist the user in visualizing the method of the Invention. The imaginary polygon 2 can have any number of sides and can be regular or irregular, but a rectangle 6 having four sides 8 is preferred. The user further imagines that the rectangle 6 is assigned to one of user's fingers 10. The user imagines that the rectangle 6 tracks the finger 10 assigned to that rectangle 6 on the surface of the glance pad 4 and that the rectangle 6 therefore moves with the hand 12 of user. The user imagines that the imaginary rectangle 6 remains centered on the finger 10 to which the rectangle 6 is assigned.

Figure 2:
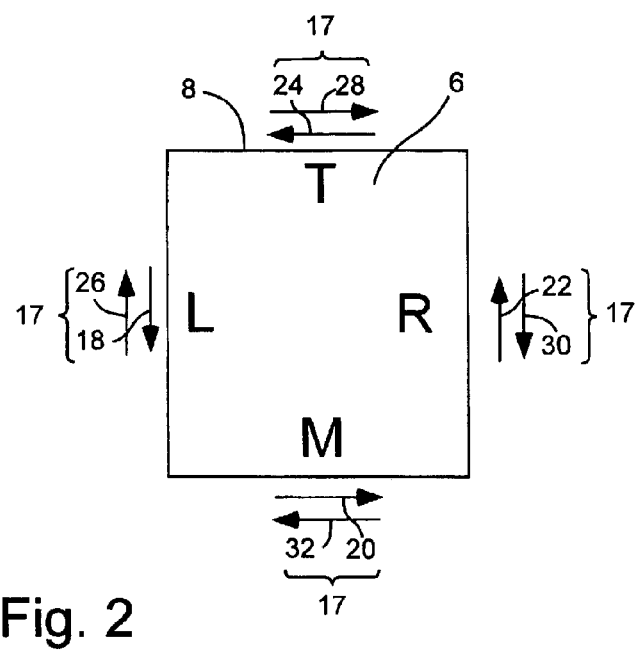
FIG. 2 is a schematic diagram of the method of the invention.
Figure 3:
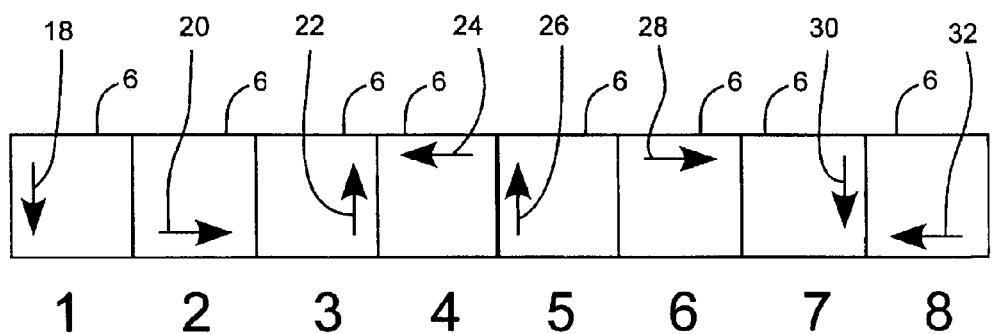
FIG. 3 is a schematic diagram of the method of the invention.

The imaginary rectangle 6 has four sides and further has two directions 14, 16 of motion with respect to each side; namely, clockwise 14 and counterclockwise 16 with respect to the rectangle 6. The user further imagines that a single encoding touch 17 by the user's finger 10 to the glance pad 4 generally contiguous to one of the four sides 8 of the rectangle 6 and generally in one of the two possible directions 14, 16 will encode one symbol. As illustrated by FIG. 2, eight encoding touches 18, 20, 22, 24, 26, 28, 30, 32 are possible with respect to the rectangle 6 and eight different symbols therefore may be encoded by the eight possible encoding touches 18, 20, 22, 24, 26, 28, 30, 32. Each of the eight encoding touches 18, 20, 22, 24, 26, 28, 30, 32 for a single rectangle 6 is illustrated by FIG. 3. As an example, the eight encoding touches 18, 20, 22, 24, 26, 28, 30, 32 shown by FIG. 3 may encode the numerals one through eight.

The user further imagines that a separate imaginary rectangle 6, 34, 36, 38 is assigned to each of a plurality of user's fingers 10, as shown by FIG. 1. Each of the imaginary rectangles 6, 34, 36, 38 moves with the finger 10 to which the rectangle 6 is assigned. A single encoding touch 17 generally contiguous to one of the four sides 8 of any one of the rectangles 6, 34, 36, 38 and in one of the two possible directions 14, 16 encodes a symbol. As shown by FIGS. 1, 2 and 3, each of the user's fingers 10 may encode eight different symbols.

Figure 4:
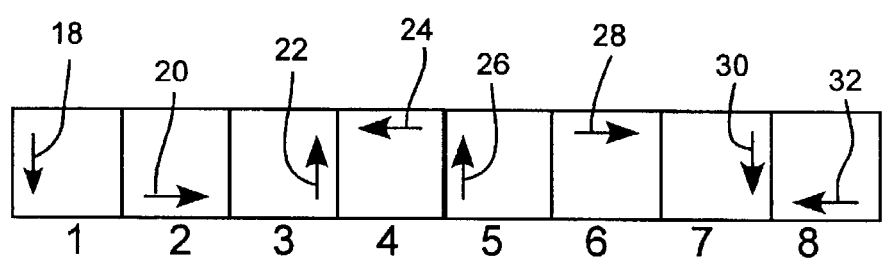
FIG. 4 is a spread sheet of a possible symbol assignment of the invention.

FIG. 4 is a chart showing a possible symbol assignment to four fingers 10 of a hand 12 of the user. The eight encoding touches 18, 20, 22, 24, 26, 28, 30, 32 for each finger 10 are shown at the top of FIG. 4. The four fingers 10, labeled one through four are shown on the left side of FIG. 4. As shown by FIG. 4, four fingers 10 of the user's hand 12 may encode more than the twenty-six letters of the alphabet. The symbol assignment shown by FIG. 4 is an example and other symbol assignments are possible. The Invention is not limited to a particular symbol assignment.

Figure 5:
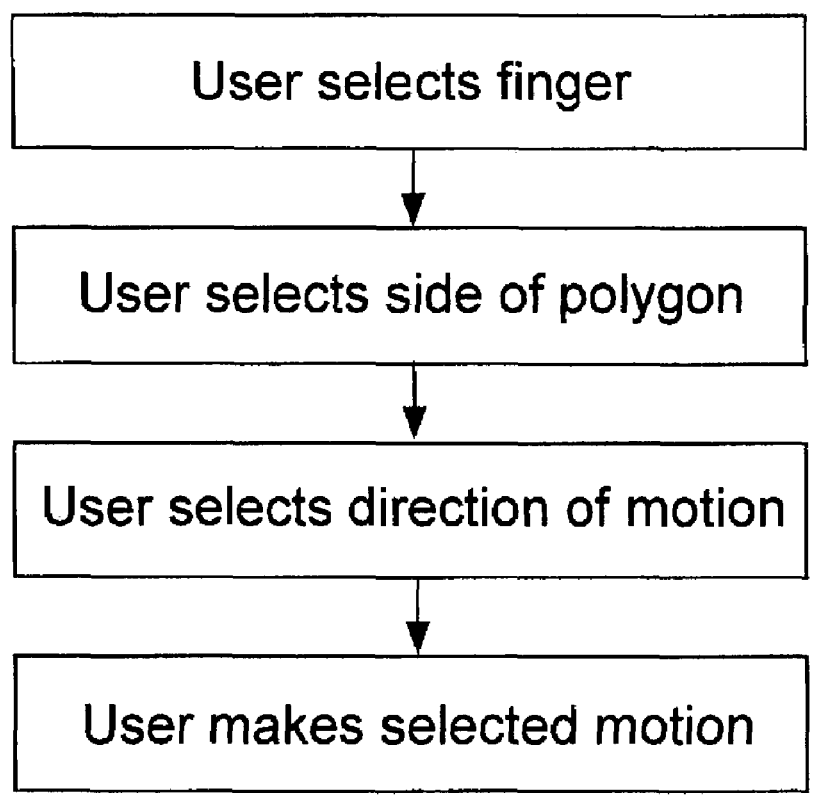
FIG. 5 is a flow chart of the method of the invention.

To encode a symbol using the method of the Invention and as shown by the flowchart of FIG. 5, the user selects a finger 10, selects a side 8 of the rectangle 6 assigned to that finger 10, and selects a direction of motion 14, 16 corresponding to the symbol to be encoded. The user begins to move the selected finger 10 to the selected side 8 of the selected rectangle 6. The user imagines that the imaginary rectangle 6 assigned to that finger 10 freezes in position and ceases to track the finger 10 at the moment the user begins to move the finger 10 toward the selected side. The user completes the motion to the selected side 8 and makes an encoding touch 17 along the selected side 8. The user imagines that the imaginary rectangle 6 is unfrozen at the moment of the completion of the encoding touch 17 and again tracks the finger 10, ready to encode another symbol.

Figure 6:
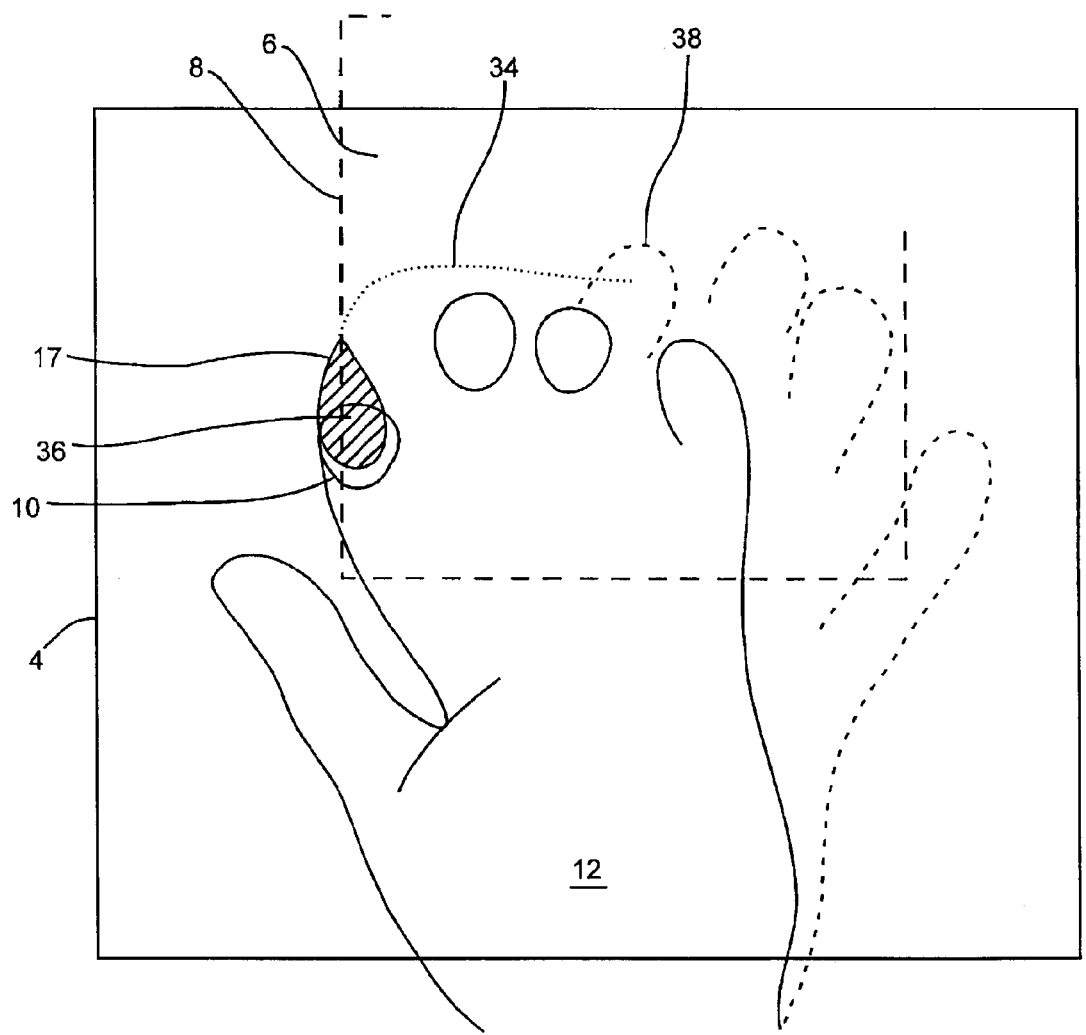
FIG. 6 is a schematic diagram of the method and apparatus of the invention.

A typical encoding touch 17 is illustrated by FIG. 6. In FIG. 6, the user wishes to encode the letter "a" as shown on the chart of FIG. 4. The user accordingly selects the user's index finger 10 and selects an encoding touch 18 on the left side 8 of the imaginary rectangle 6 in a counterclockwise direction 16. The user imagines that the rectangle 6 assigned to the index finger 10 is frozen in position. The user moves his or her hand 12 in adduction (toward the medial line of the body) toward the left side 8 of the rectangle 6. Upon reaching the imaginary left side 8 of the imaginary rectangle 6, the user flexes his or her index finger 10, touching the glance pad 4 in the counterclockwise direction 16 and encoding the letter "a." The path of the finger 10 is shown on FIG. 6 by a dotted line 34 and the area of the glance pad 4 touched by the finger 10 in the encoding touch is indicated by cross hatching 36.

The motions used for operating the glance pad 4 are determined by the biomechanics of the hand 12 of the user. Two general motions are brought into play; namely, adduction-abduction of the wrist and flexion-extension of the fingers 10. Adduction is rotation by the wrist toward the medial line of the body. Abduction is rotation by the wrist away from the medial line of the body. FIG. 6 shows adduction of the wrist from an initial position (shown by dashed lines 38 on FIG. 6) to a final position (shown by solid lines). The left-right motion of a finger 10 is largely determined by the adduction-abduction motion of the wrist, although some independent left-right motion by individual fingers is possible. Because of the biomechanics of the hand 12, all of the fingers 10 follow the adduction-abduction motion of the wrist and all fingers 10 move in the same direction by about the same amount. As described below, the tendency for all fingers 10 to move in the same direction by about the same amount allows the motion of a selected finger 10 to be inferred by the motion of the other fingers 10 in the adduction-abduction direction where data on motion of the selected finger 10 is incomplete or ambiguous.

Figure 7:
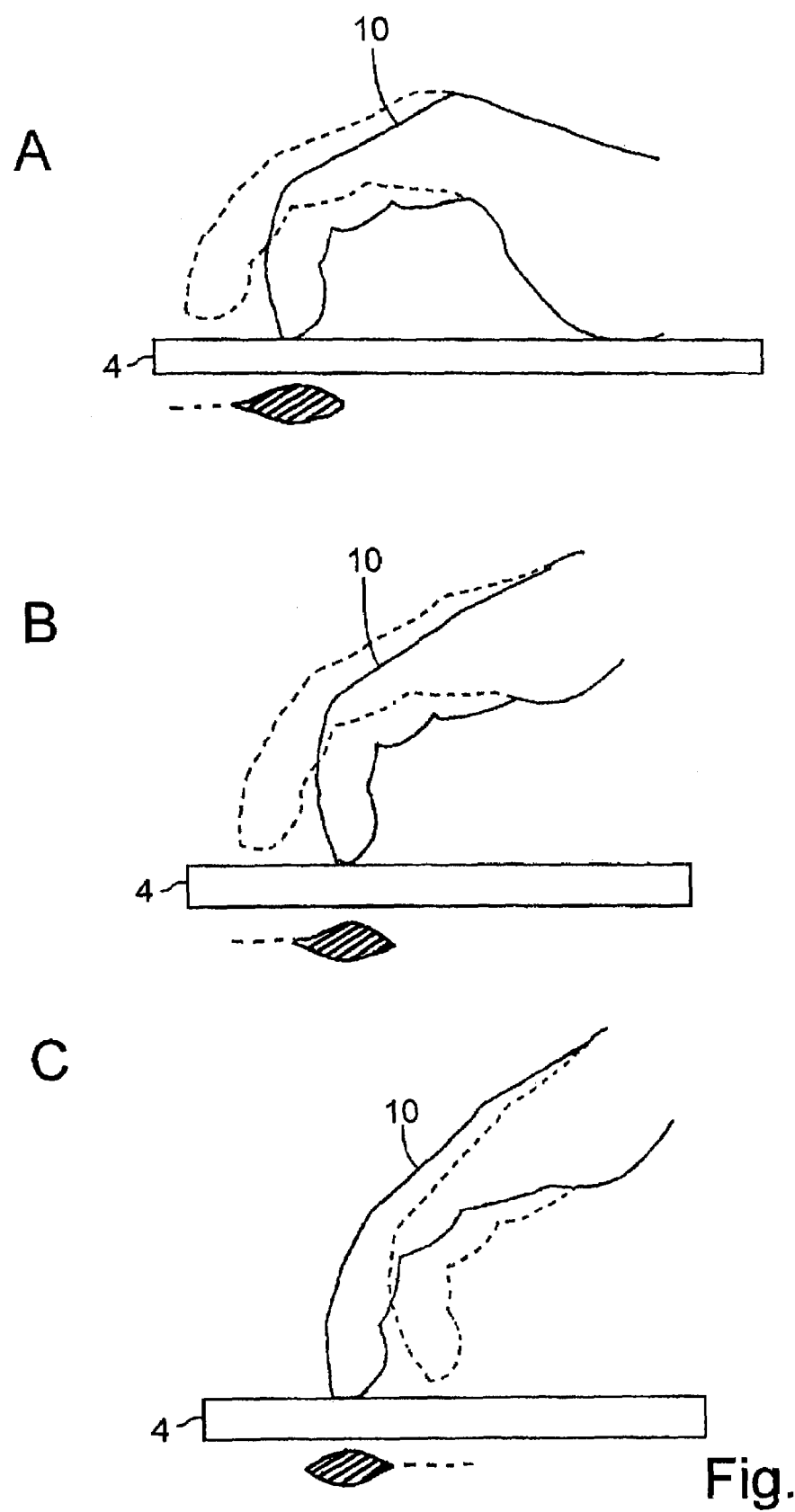
FIG. 7A-C are side views of the apparatus in use.

FIGS. 7A–C illustrate flexion and extension of the fingers 10. In FIGS. 7A and 7B, an encoding touch 17 is shown using the flexion (curling) motion of a finger 10. In FIG. 7C, an encoding touch 17 using the extension motion of the finger 10 is illustrated.

Figure 8:
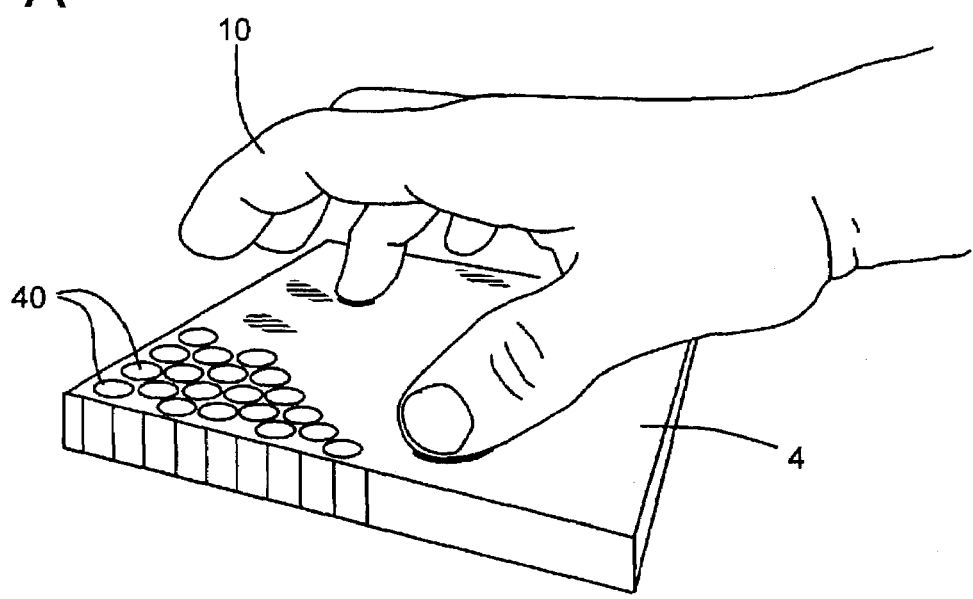
FIGS. 8A and B are perspective views of the apparatus in use.
Figure 8:
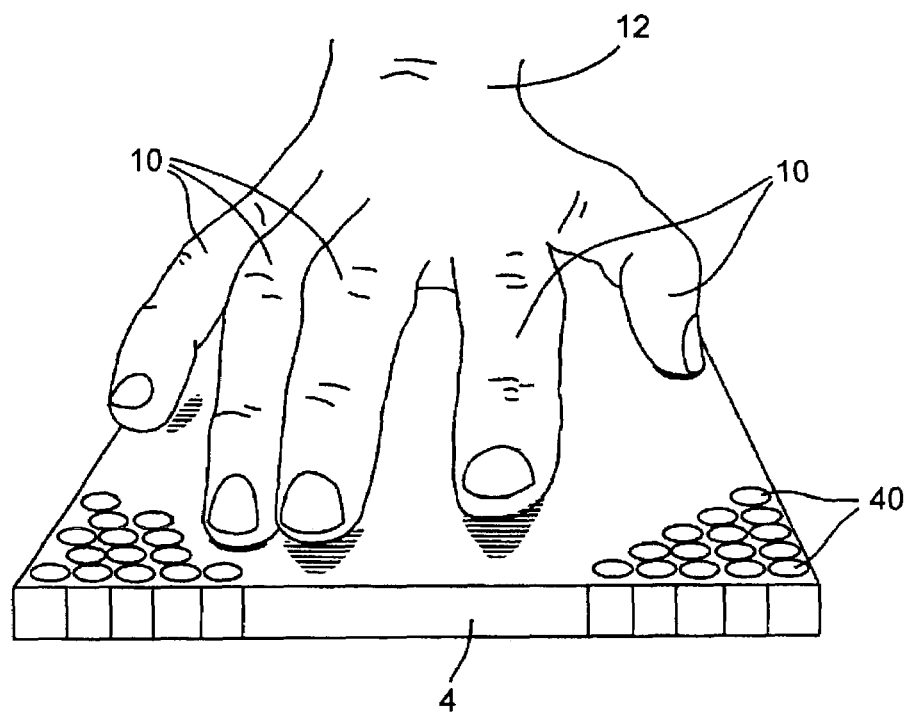
Figure 9:
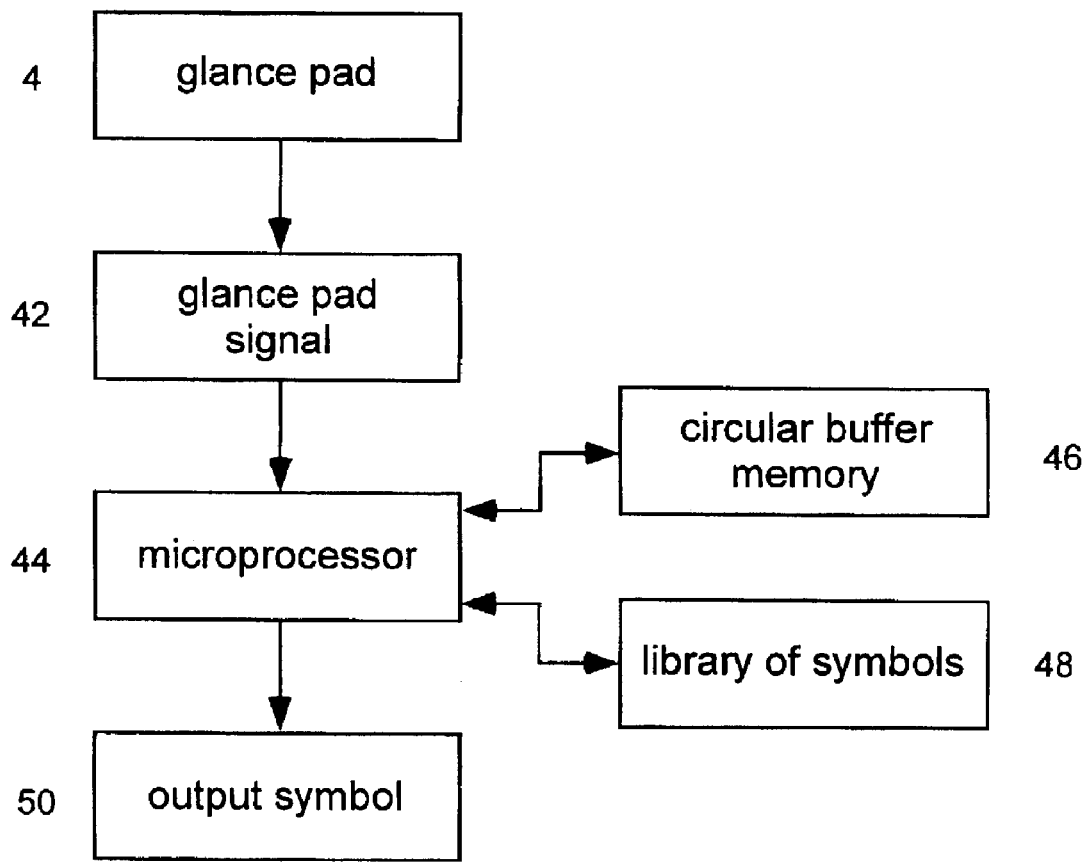
FIG. 9 is a schematic diagram of the apparatus.

The apparatus of the Invention detects the motion of the user's fingers 10 and infers the intent of the user. As shown by FIGS. 8A and B, a glance pad 4 includes a multiplicity of detector nodes 40 arranged in an array. The user places his or her hand 12 in the vicinity of glance pad 4, preferably distanced and supported by the thumb touching the glance pad 4. Detector nodes 40 detect the motion of user's fingers 10 and detect an encoding touch 17 by any of user's fingers 10 to the glance pad 4. As shown by the block diagram of FIG. 9, the glance pad 4 generates an output signal 42 in response to the proximity of the user's fingers 10 and in response to the encoding touch 17. The output signal 42 is received by a microprocessor 44 which tracks the location of each of the fingers 10 of user in the vicinity of the glance pad 4. Information to track the location of each of user's fingers 10 is stored temporarily in circular buffer 46 memory using a first in, first out configuration so that obsolete information is discarded and replaced with new information from the glance pad signal 42. The microprocessor 44 evaluates the glance pad signal 42 and infers the intent of the user, as described below. When the microprocessor 44 infers that the user intended to encode a symbol, the microprocessor 44 consults a library of symbols 48, selects the appropriate symbol and generates an output 50, thereby communicating the selected symbol.

As used in this application, an 'encoding touch' 17 is a sliding touch by the finger 10 of the user to the surface of the glance pad 4. The encoding touch 17 is generally contiguous with the selected side 8 and generally in the selected direction 14, 16. As used in this application, the term 'generally contiguous' means that the microprocessor 44 is able to infer which side 8 of the imaginary rectangle 6 or which direction was selected by user. As used in this application, the term "generally in the selected direction" means a motion such that the microprocessor 44 is able to infer the direction 14, 16 selected by user. The term "generally clockwise" or "generally counterclockwise" means a motion such that the microprocessor 44 is able to infer whether the user intended a clockwise 14 or counterclockwise 16 direction for the encoding touch 17. As used in this application, the term "encoding motion" means a motion by a user conveying information as to a selected side 8 and selected direction 14, 16 of a selected polygon 2 to allow an inference of the intent of the user to select the side 8 and the direction 14, 16.

Suitable technologies are well known in the art and may be used for proximity and encoding touch detection. Technologies that may be suitable, depending on the application, are: photoreceptors based on any part of the light spectrum, sensors sensitive to changes in capacitance, sensors detecting distortion of an inductive field caused by the presence of the fingertips, and sensors detecting acoustic energy. Any other sensor or combination of sensors detecting proximity and touch may be used. Photodiodes or phototransistors 40 sensitive to infrared light are preferred. Detectors utilizing a different technology may be appropriate where ambient light interferes with operation of infrared photodiodes or phototransistors 40. Other technologies to enhance operation of an optical glance pad 4 may be used, such as use of gloves having reflective fingertips, providing reflective coatings for the fingertips, or use of light sources mounted on the fingertips.

The photocell 40 may also use CCD sensors of a type used in video cameras. In such case each photocell 40 is a small, telescopic-view video camera. The height of the photocell 40 and the focal length of the lens are selected to enhance and optimize directional sensitivity of the CCD photocell 40.

Each photocell 40 of the array acts as a switch that is activated when light exceeding a preset threshold impinges on the photoreceptor 50 of the photocell 40. The threshold may be adjusted by selecting a photocell 40 of appropriate sensitivity, by changing the gain of sensor's amplifying devices, or by changing the intensity of light.

Operation of a typical infrared photodiode or phototransistor glance pad 4 is shown by FIGS. 10A–C and 11. A row of photocells 40 is illustrated. Each photocell 40 is conical (FIG. 10A) or cylindrical (FIG. 12A) in shape. Each photocell 40 has a lens 52 and a photoreceptor 50. Infrared light 54 produced by an illuminator 56 passes through light guides 58, which are gaps between the photocells 40. The illuminators 56 are distributed so as to provide an evenly diffused illumination above the pad 4 surface. The light illuminates the fingertip 10 of the user, which reflects light 54 toward the glance pad 4. Directional sensitivity is obtained by mounting the photoreceptor 50 at the bottom of the photocell 40, and supplying each cell 40 at its outer aperture with a lens 52. Light 54 is absorbed and extinguished when it hits the inner wall of the photocell 40 and only light 54 that is generally orthogonal to the glance pad 4 surface reaches the photoreceptor 50. Light 54 entering from directly above the photocell 40 passes through the lens 52 and strikes the photoreceptor 50, activating the photocell 40.

Figure 10A:
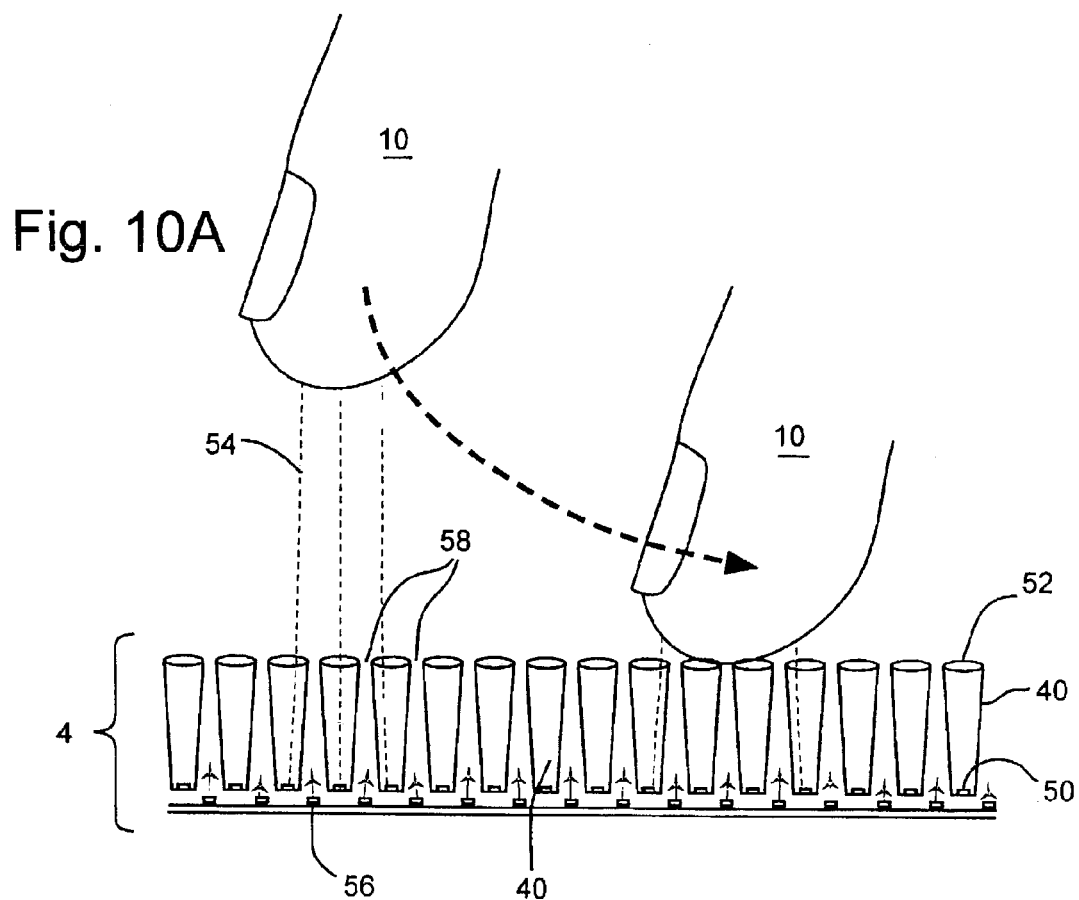
FIG. 10A is a side view of the apparatus.
Figures 10B, 10C:
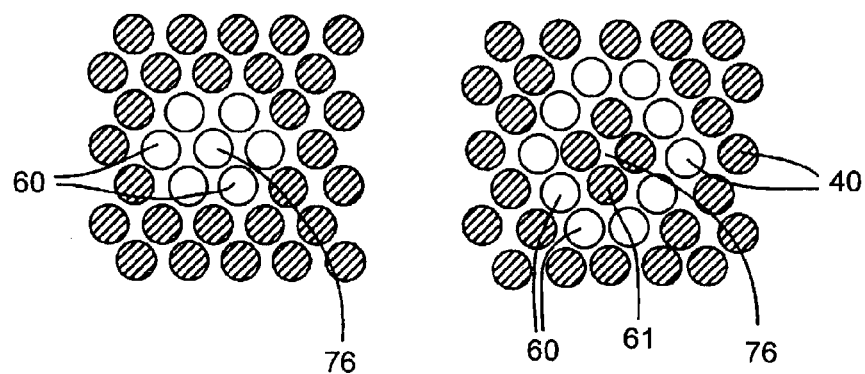
FIGS. 10B and C are views of active and inactive photocells.

When a finger 10 is in close proximity but not touching the glance pad 4, as shown by finger 10 on the left side of FIG. 10A, a generally circular group 60 of photocells 40 is activated surrounded by photocells 40 that are not activated. A typical group 60 of activated photocells 40 for a finger 10 in close proximity, but not touching, the glance pad 4 is shown by FIG. 10B as a group of open circles. Non-activated photocells 40 are indicated by cross hatching.

When the finger 10 makes an encoding touch 17 to the glance pad 4, as shown by the finger 10 image on the right side of FIG. 10A, the finger 10 covers the top of the photocells 40 at the location of the touch 17, blocking entry of light 54 into certain of the photocells 40 and causing those photocells 40 to be inactive. Light 54 reflected by the finger 10 at the perimeter of the blocked area activates a ring of photocells 40 and produces a larger area of activated photocells 40. A typical pattern of activated photocells 40 during an encoding touch 17 to the glance pad 4 is shown by FIG. 10C as a ring of open circles, and inactive photocells 40 are shown by cross hatching. The difference in the pattern of activated photocells 40 illustrated by FIGS. 10B and 10C allows the apparatus of the Invention to discriminate between a finger 10 in proximity and a finger 10 touching the glance pad 4.

Figure 11:
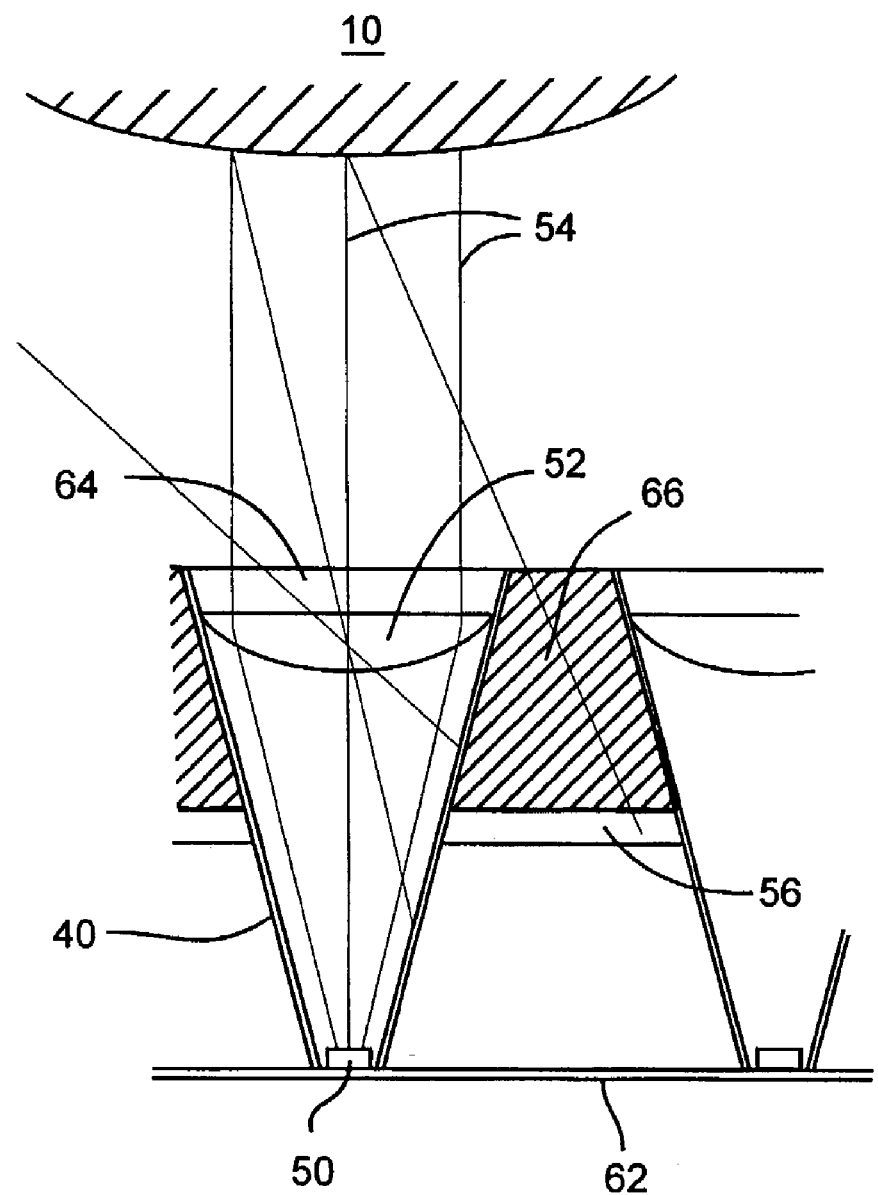
FIG. 11 is an enlarged cutaway diagram of a photocell.

FIG. 11 shows an enlargement of a single illuminator 56 and a single photocell 40 from the array of photocells. The illuminator 56 is close to the surface of the glance pad 4, creating space for the electronic circuitry of the pad 4. A circuit board layer 62 may be used as a substrate for printed connections. An infrared filter 64 covers the lens 52. Paths of light 54 are shown as lines. The illuminator 56 may be equipped with a plano-concave, light diffusing lens 66 to provide diffuse, even illumination.

Figure 12A:
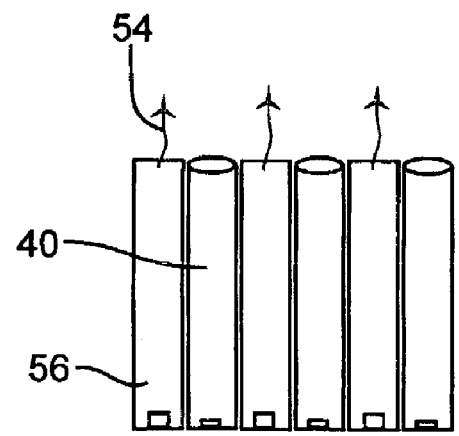
FIGS. 12A–C are alternative photocells.
Figure 12B:
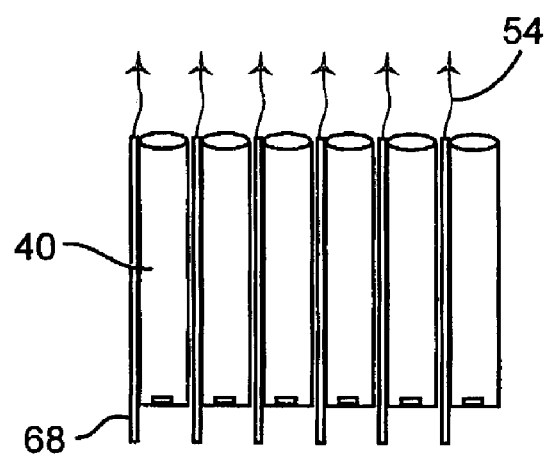
Figure 12C:
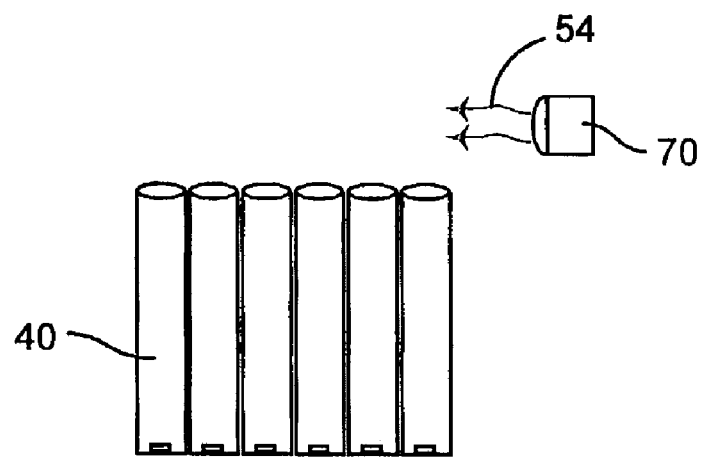

Some of the alternative designs of reflective-type photocells 40 are shown on FIG. 12A-C. FIG. 12A shows an array of cylindrical photocells 40 with illuminators 56 interspersed between the photocells 40. Illuminators 56 may be infrared light emitting diodes. Illuminators 56 may be equipped with an illuminator lens 66 to control the quality of illumination. FIG. 12B shows fiber-optic light-guide illuminators 68. As shown by FIG. 12C, the glance pad 4 may dispense with illuminators 56, and a source of illumination 70 may be provided external to the glance pad 4. An infrared light source 70 may be attached to the fingers 10 of user.

In operation the output of a photocell 40 assumes one of two possible states: a high state corresponding to an activated photocell 40 and a low state corresponding to a photocell 40 that is not activated. The signal from each photocell 40 may be conditioned using well-known techniques prior to supplying the signal to the microprocessor 44. For example, a Schmitt trigger may be used to provide a fast rising and falling edge at signal transition. Hysteresis also may be designed into the photocell 40 circuit using well-known techniques to limit oscillation. An array of photocells 40 may be treated like a RAM buffer, and information stored on the photocell 40 array may be accessed using well known methods, and when required, mapped to the circular buffer memory 46 and read by the microprocessor 44. In a different variant the voltage produced by the photocells 40 may be measured individually for each cell 40 by well-known A/D sampling processes and the data transmitted to the microprocessor 44 and to the circular buffer memory 46.

Figure 13:
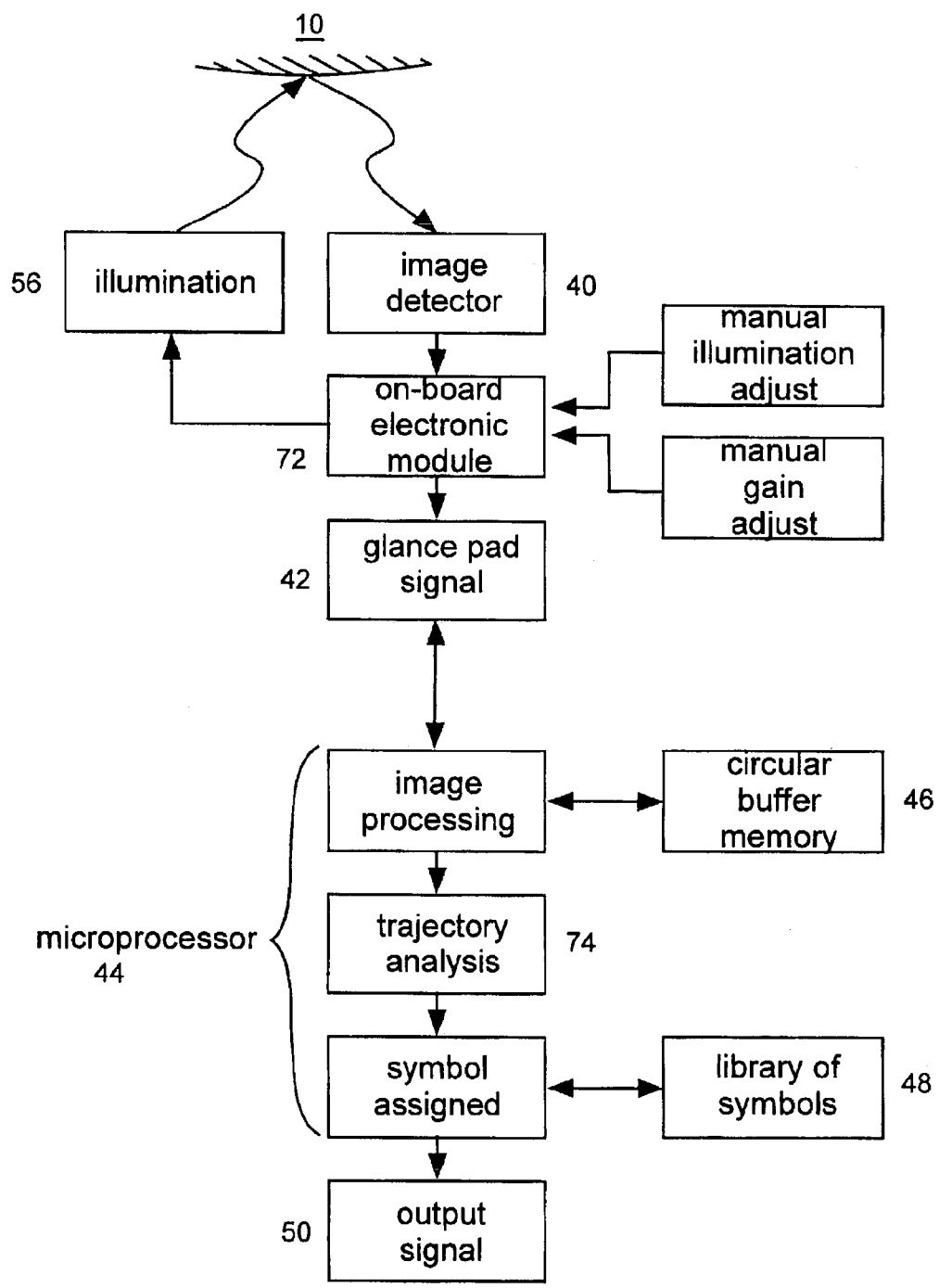
FIG. 13 is a block diagram of the apparatus.

A block diagram of FIG. 13, illustrates operation of the apparatus of the Invention. Light 54 emitted by illuminators 56 is reflected from the surface of the nearby fingertip 10 and activates certain photocells 40 of the glance pad 4 corresponding to the proximity of the fingertip 10 to the glance pad 4. The magnitude of the signal recorded depends on the intensity of the light 54 emitted, the distance from the light-reflecting fingertip 10, the reflective properties of the fingertip 10 and the sensitivity of the photocells 40. Circuitry for gain and illumination adjustments may be embedded into the glance pad 4. More advanced signal processing devices, e.g. providing edge conditioning and contrast enhancement, may also be applied at the sensor level as is well known in the art. More sophisticated data extraction algorithms may be applied by the microprocessor 44, enhancing and correcting the reflectance images of the user's fingers 10.

An on-board electronic module 72 supports data gathering from the photocell 40 array. The electronic module 72 applies any of several techniques well known in the art for sampling the state of each photocell 40 in the array; for example by connecting the rows and columns of photocells 40 to a multiplexer. A control program operating the electronic module 72 selects which traces of the array are to be sampled and cycles continuously. An output 42, comprising a continuing series of snapshots of the state of each photocell 40 of the array, is stored in the circular buffer memory 46. These snapshots of the states of the nodes 40 of the glance pad 4 are further processed by the microprocessor 44 to identify the fingers 10 of the user, to trace fingertip 10 motion and ultimately to infer the intent of the user in making an encoding touch 17.

The on-board electronic module 72 may control the activation threshold of each photocell 40 by changing the gain of the photocell 40 amplifiers or by changing the intensity of the light 54 emitted by the illuminators 56. The most important function of the on-board electronic module 72 is that of an interface between the photocells 40 and the microprocessor 44. In some implementations the on-board electronic module 72 may also control more elaborate sensor scanning schedules, and even may perform simple image processing functions, such as intensifying the contrast of reflectance images. Feedback from the on-board electronic module 72 may be used for automatic illumination adjustment or for adjustment of photocell 40 amplifier gain. Such modulation may be temporally and spatially diverse, and may have a planar gradient, e.g. higher sensitivity at the right edge of the glance pad 4 and lower sensitivity toward the left, or higher at the edges and lower in the middle. The microprocessor 44 and associated apparatus may be incorporated physically into the body of the glance pad 4 to form an integrated device.

From the on-board electronic module the image is, scan after scan, sent to the microprocessor 44 and to the circular buffer memory 46. A stored array proximity map may then be accessed by the microprocessor 44 and processed to detect an X axis and Y axis activation area for each finger 10 in the proximity of the pad 4. Using these data the microprocessor 44 performs pattern identification, comprising functions of image processing and trajectory analysis 74. The microprocessor 44 infers the intent of the user from the detected finger 10 motion and assigns a symbol to the motion from the library 48 corresponding to the finger 10. The symbol is transmitted by the apparatus as an output signal 50, thereby encoding or communicating the symbol.

Figure 14:
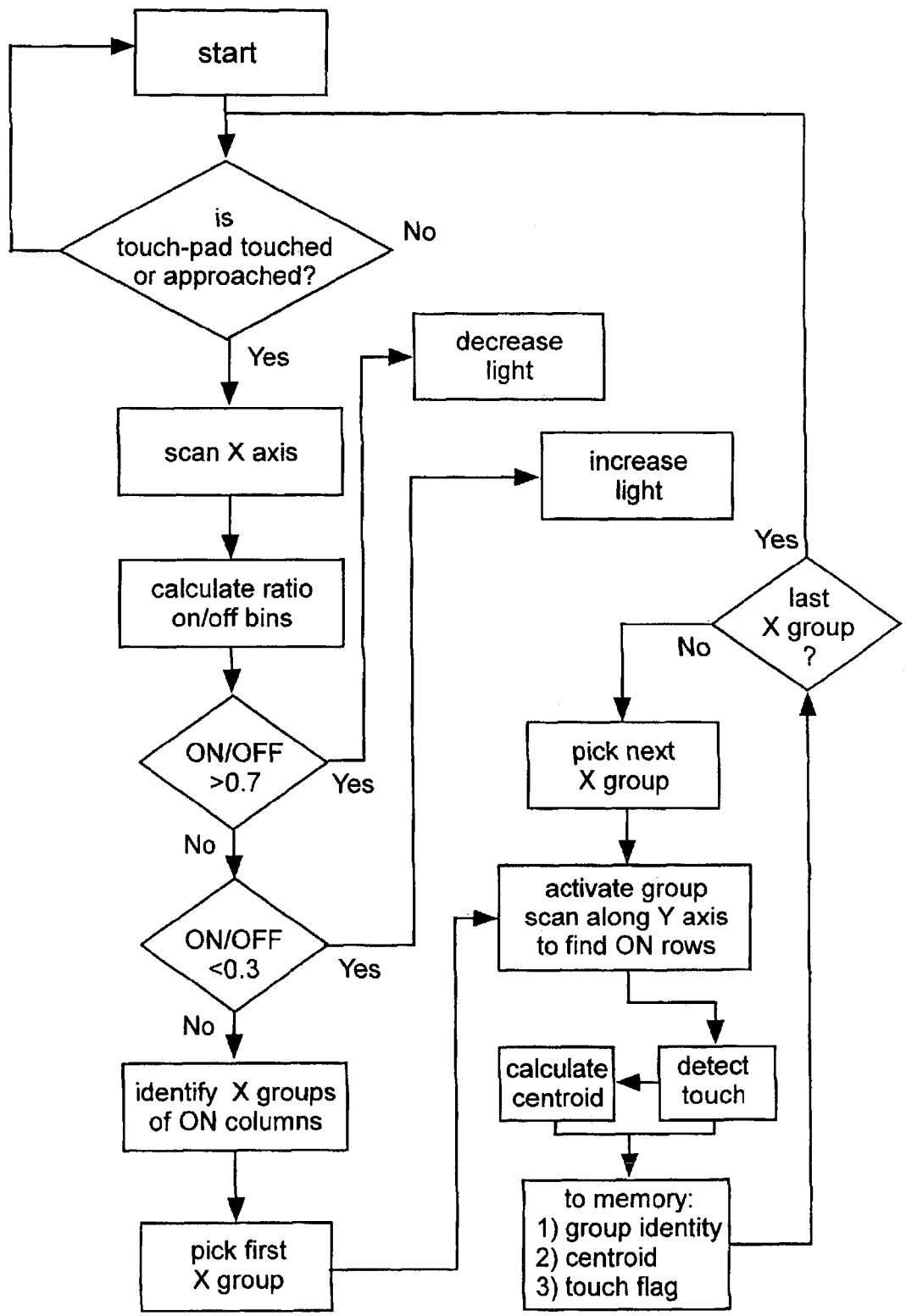
FIG. 14 is a flow diagram of the operation of the apparatus.

FIG. 14 illustrates the operation of the microprocessor 44. In FIG. 14 the array of photocells 40 detects a touch or an object in proximity to the glance pad 4. Sampling of the state of each photocell 40 identifies all photocells 40 in the array that are activated. Each photocell 40 of the array is independently sampled and raw images of the whole array are stored in circular buffer memory 46. Subsequently, a center of each activated area of photocells, a "centroid," 76 (FIGS. 10B, 10C) is computed, to be used for the trajectory analysis 74.

To speed up scanning, a system involving sampling of lines of photocells 40 is implemented in the microprocessor 44. The microprocessor 44 samples each photocell 40 column 81 along the X-axis of the photocell 40 array, finding columns 81 of photocells 40 containing at least one activated photocell 60. The microprocessor 44 performs a first error check to determine whether the number of columns with activated photocells 60 is consistent with the detection of the correct number of fingers 10. Activation of too few photocells 40 indicates that the fingers 10 are not being detected and that illumination or photocell 40 gain should be increased and the scan repeated. Activation of too many photocells 40 implies reflection from the palm or phalanges, resulting in ambiguous and inaccurate signals. Activation of too many photocells 40 can be avoided by reducing illumination or reducing photocell 40 amplification. The ratio of the number of columns of photocells 40 having at least one activated photocell 40 to the total number of columns of photocells 40 is calculated by the microprocessor 44 and compared with the predetermined maximum value, for example 0.7. If the ratio is greater than a predetermined maximum, the microprocessor issues a command that the illumination be reduced. If the ratio is less than a predetermined minimum, for example 0.3, the microprocessor 44 issues a command to increase illumination.

Once an appropriate number of photocells 40 is determined to be activated, the microprocessor 44 can proceed to locate the fingers 10 of user. The microprocessor 44 first examines the photocells 40 in each column along the X axis for the presence of activated photocells 60, the results of which may be presented as a diagram. The diagram would show a distribution of columns of photocells 40 having activated photocells 60. The columns having activated photocells 60 would appear as a number of separate groups of activation. Intensity of illumination or gain of the photocell 40 amplifiers is automatically and reactively adjusted so that the preset number of four groups is detected, corresponding to the detection of four fingers 10. The number of groups may be set to correspond to the number of fingers 10 operating the device, which may vary between one and ten.

After identification of the X axis groups corresponding to the location of each of the fingertips 10 of the user, the microprocessor 44 performs a similar operation from the perspective of the Y axis photocells 40 isolated for each fingertip 10. The photocells 40 in each group of activated photocells 60 are examined to identify rows containing at least one active photocell 60, producing a photocell 40 activation distribution for each group of activated photocells 60 viewed from the Y axis perspective. This procedure avoids the problem of overlap of activations produced by fingertips 10, which tend to occupy similar Y axis position. This procedure isolates the fingertip 10 images and produces only one group of activated photocells 60 per fingertip 10 per scan. The problem of overlapping activation of photocells 10 caused by multiple fingers does not exist for X direction scans described above because glancing fingers 10 are separated in the X direction and produce discrete X-axis groups of activated photocells 60.

The procedure described above to isolate activated groups of photocells 60 corresponding to each finger 10 of user also may be used to selectively illuminate each fingertip 10. For example, only the illuminators 56 adjacent to the photocells 40 of the array which are scanned may be illuminated in a pulse fashion during each scan. Interfering reflections are thereby reduced and the contrast of the targeted reflection is thereby enhanced. By matching the position of activated illuminators 56 with the position of activated photocells 40, remote spurious activations may be eliminated, and multi-point image detection may be accomplished rapidly, accurately and with energy efficiency.

Shown here is the simplest scheme of detecting the position of fingers 10 in relation to the touch pad 4. Another, more accurate implementation would involve building the frequency distribution of activated photocells 60 along the X and Y dimensions of the touch pad 4. Building a frequency distribution involves counting the number of activated cells 60 for each row and each column of the array, instead of finding each row and each column containing at least one activated photocell 60, as in the previous implementation. A center of activation 76 for each fingertip 10 is found as the location on the X axis of the computed center for the group.

Once the groups of activated photocells 60 corresponding to each finger 10 are obtained as described above, a centroid 76 may be determined corresponding to each finger 10 by plotting the center of the X activation and the center of the Y activation onto the surface of the glance pad 4, thus locating the fingertip 10 with respect to the glance pad 4. A centroid 76 is defined as a central tendency measure of the pattern of activated photocells 40 corresponding to a single fingertip 10.

The microprocessor 44 may perform error detection and correction actions. For example, if the microprocessor 44 is unable to detect one or more of user's fingers 10, the apparatus may deliver an appropriate warning to user, prompting user to correct his or her hand 12 position or to adjust the controls of the glance pad 4.

To detect whether touch to the surface has occurred, a peak amplitude/X value ratio for selected group of activated photocells 60 is calculated, where peak amplitude is the activation amplitude and the X is the width of the area of activated photocells 60. The peak amplitude/X value ratio differentiates between off-pad finger 10 positions and encoding touches 17. As seen on FIGS. 10B and C, the off-pad fingertip 10 image has a circular outline with small radius, produces a bell shape distribution of active elements 60, and a high peak amplitude/X value ratio. Conversely, an encoding touch 17 produces a broad, flat distribution of active photocells 60 due to wide fingertip 10 outline and a low peak amplitude/X value ratio. For the confirmation of touch detection, the calculation may be repeated for the Y-axis activated groups of photocells 60. Alternatively, the dark center 61 encircled by activated photocells 60 may be identified as an indication of touch as shown by FIG. 10C.

Computed values for centroids 76 for all fingers 10 and indicators of encoding touches 17 are recorded in a circular buffer memory 46 and maintained for a period of time, for example one second. The information in the circular buffer memory 46 is available for calculation of trajectories 74 by the microprocessor 44.

Figure 15:
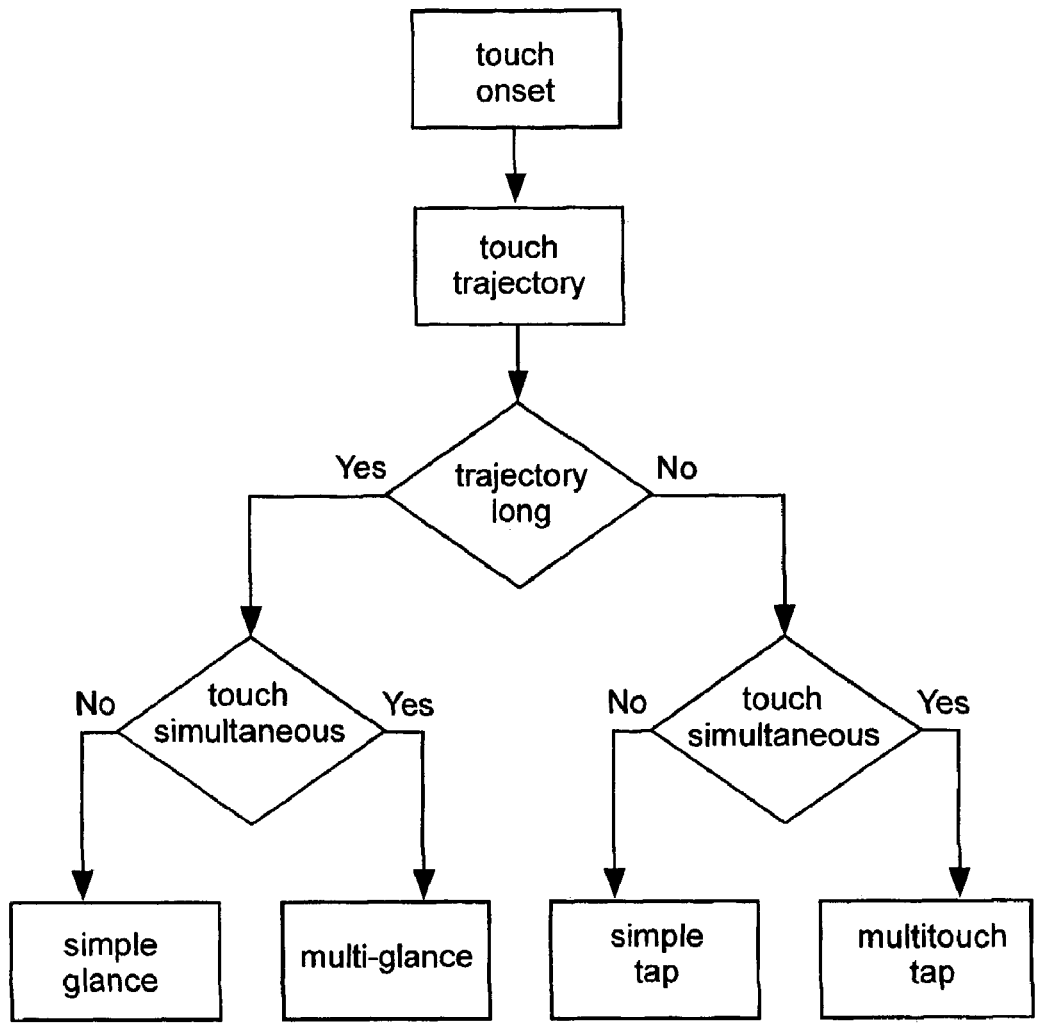
FIG. 15 is a flow diagram of the operation of the apparatus.

Different touching motions may be used to encode different information. In addition to the glances discussed above, multiple glancing motions by two or more fingers 10 simultaneously may encode symbols. A tap or multiple taps by the finger 10 to the glance pad 4 also may encode information. A tap is a touch to the glance pad 4 that is not a sliding touch and does not have a direction component. FIG. 15 shows a block diagram of a method for discriminating a single glance, a tap, a multiple glance and a multiple tap. Upon detection of a touch, the microprocessor 44 examines the trajectory of the finger 10 making the touch and measures the duration of the touch. The microprocessor 44 compares the duration of the touch against a predetermined value, separating taps from glances based on the brief duration of a tap. The microprocessor also may distinguish between taps and glances by considering the length and duration of the approach trajectory of the finger. If the trajectory is relatively short, the microprocessor 44 may infer that the ensuing touch is a tap. If the trajectory is relatively long, the microprocessor 44 may infer that the touch is a glance. Consideration of multiple factors to distinguish taps and glances may assist the microprocessor 44 in resolving encoding touches that otherwise are ambiguous.

If the touch is determined to be a tap, the microprocessor 44 determines whether a tap is close enough in time to any other tap to render it a multiple tap. If the touch is determined to be a glance, the microprocessor 44 determines whether the glance was close enough in time to other glances to be a multiple glance.

As mentioned above, each glance trajectory is split into two components: (1) an approach or positioning motion and (2) touch motion. Using both components two glance-defining vectors are calculated. The following description presents one among many ways that the glance pattern encoding can be realized.

Figure 16:
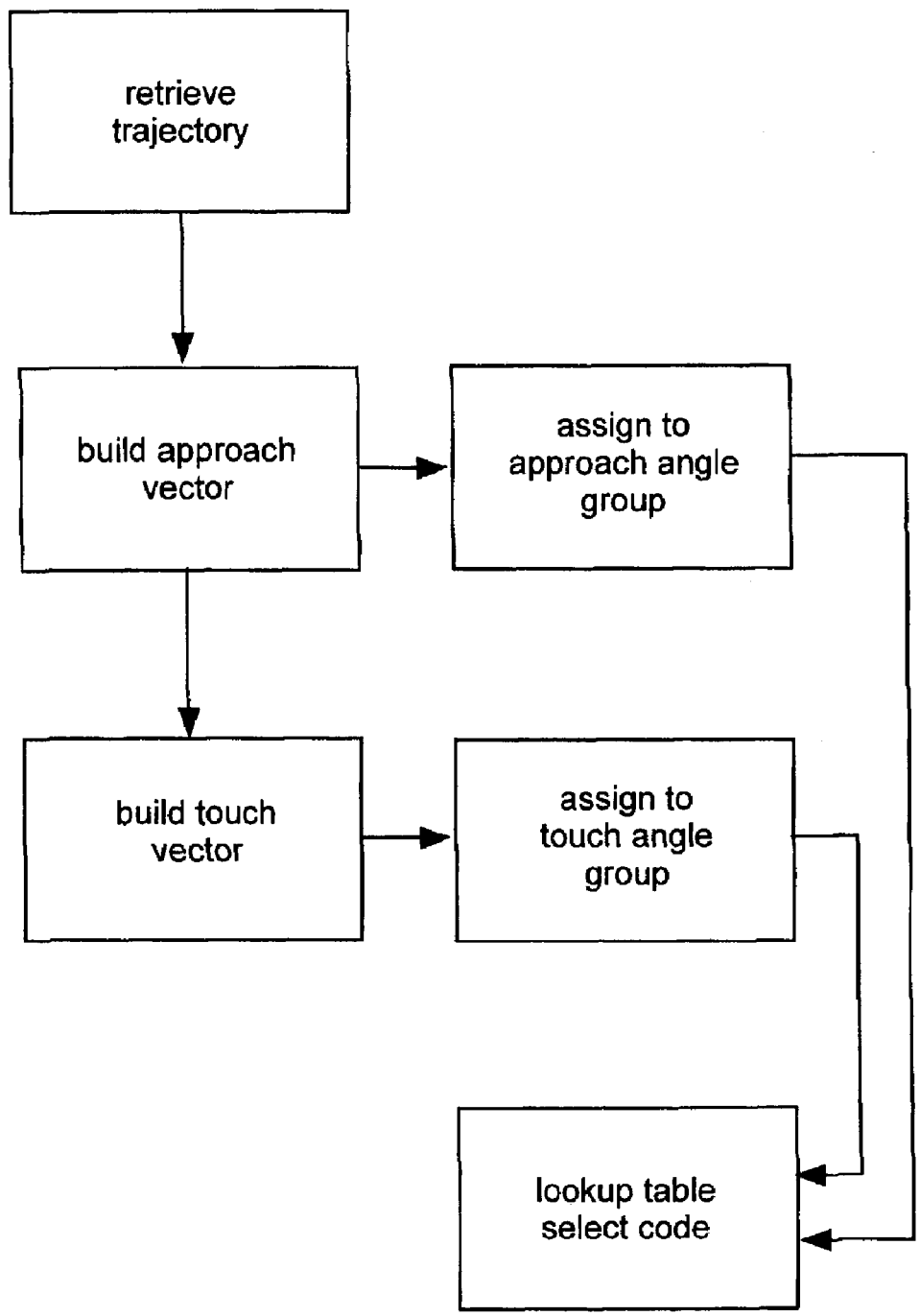
FIG. 16 is a flow diagram of the operation of the apparatus.

The apparatus of the Invention infers the intent of the user to encode a particular symbol by determining an approach vector 80 corresponding to an encoding touch 17 and by determining a touch vector 82 corresponding to the direction 14, 16 of the encoding touch 17. The method is summarized by FIG. 16 and illustrated by FIGS. 17, 18 and 19A–C.

The apparatus continually monitors the location of each finger 10 and tracks the motion of each finger 10 in circular buffer memory 46. FIG. 19C shows the paths followed by a first finger 10 and a second finger 10 of a hand 12 in making two encoding touches 17, 84. The path of the first finger 10 is indicated by the curved line 86 on FIGS. 19B and C. The path of the second finger 10 is indicated by curved line 88.

The microprocessor 44 detects the first encoding touch 17 based on the pattern of activated photocells 60, as described above. The apparatus of the Invention calculates the approach vector 80 of the first finger 10 based on the record of motion of the finger 10 stored in circular buffer memory 46. The approach vector 80 is defined by an ending point 90 and a beginning point 92. The ending point 90 is determined by the microprocessor 44 as the location of the first finger 10 at a predetermined time before or at a predetermined time after initiation of the encoding touch 17. The ending point 90 is determined to allow the microprocessor 44 to adequately infer the intention of the user and may be adjusted to accommodate the skill or style of the user.

The beginning point 92 of the approach vector 80 may be determined in one or more ways depending on the situation. As shown in FIG. 19C, the beginning point 92 is determined by the location of the touching finger 10 at a predetermined time, for example 500 milliseconds, prior to the initiation of the encoding touch 17. The duration of the predetermined time may be based on the speed, skill and style of the user to allow the microprocessor 44 to infer the intent of the user.

As illustrated by FIG. 19C, the microprocessor determines a touch vector 82 revealing the direction of movement 14, 16 of the encoding touch 17 and defined by a touch vector beginning point 98 and a touch vector ending point 100. The microprocessor 44 selects the touch vector beginning point 98, for example, as the position of the finger 10 at a predetermined time, say, 50 milliseconds, prior to the start of the encoding touch 17. The microprocessor 44 selects the touch vector ending point 100 by determining the position of the finger 10 at a predetermined time, say, 25 milliseconds, after the start of the encoding touch 17. The selection of the touch vector beginning and ending points 98, 100 may be adjusted to account for the speed, skill and style of the user. As used in this application in relation to calculating a touch vector 82, the term "at the time of the initiation of the encoding touch" means that the beginning and ending points 98, 100 defining the touch vector 82 are determined by the position of the finger 10 at such times as allows the microprocessor 44 to infer the direction 14, 16 of encoding touch 17 intended by the user.

FIG. 19C also illustrates glancing motion by two fingers 10 in succession. The paths 86, 88 followed by the two fingers 10 are similar, due to the biomechanical limitations of movement inherent in two fingers 10 on the same hand 12. This similarity of motion may be augmented by the learned technique of the user (e.g., it may be desirable to make motions of other fingers 10 more similar). The first finger 10 makes a first encoding touch 17. The microprocessor 44 calculates approach 80 and touch 82 vectors and infers that the user intended to make a clockwise movement 14 on the left side 8 of the rectangle 6 assigned to the first finger 10. The microprocessor 44 assigns the symbol "e" to the first encoding touch 17, using the symbol association of FIG. 4. The user makes a second encoding touch 84 using the second finger 10. The microprocessor 44 calculates an approach vector 94 and a touch vector 95 for the second encoding touch 84. The microprocessor 44 infers that the user intended the encoding touch 84 to be in a counterclockwise direction 16 on the right side 8 of the rectangle 6 assigned to user's second finger 10. The microprocessor 44 therefore assigns the symbol "k" to the second encoding touch 84 using the symbol association of FIG. 4. Of course, any symbols could be assigned by the encoding touches 17, 84. The approach of FIG. 19C is appropriate where the finger 10 has not made another encoding touch 17 within the predetermined time used to determine the beginning point 92.

The apparatus is provided with various tools to interpret ambiguous situations, such as the situation where a second encoding touch 84 by a second finger 10 follows a first encoding touch 17 by a first finger 10 by less than the predetermined time. This situation also is illustrated by FIG. 19B. If a first encoding touch 17 preceded the second encoding touch 84 by less than the predetermined time, the location of the second finger 10 at the time of the first encoding touch 17 determines the beginning point 96 of the approach vector 94 for the second encoding touch 84.

FIG. 19A illustrates the situation where the second encoding touch 84 in question follows a first encoding touch 17 by the same finger 10. If the finger 10 in question was in the process of making the first encoding touch 17 at the predetermined time that otherwise would be used to calculate the beginning point 96 of the approach vector 94, the beginning point of the first encoding touch 17 is selected as the beginning point 96 of the approach vector 94.

Figure 17:
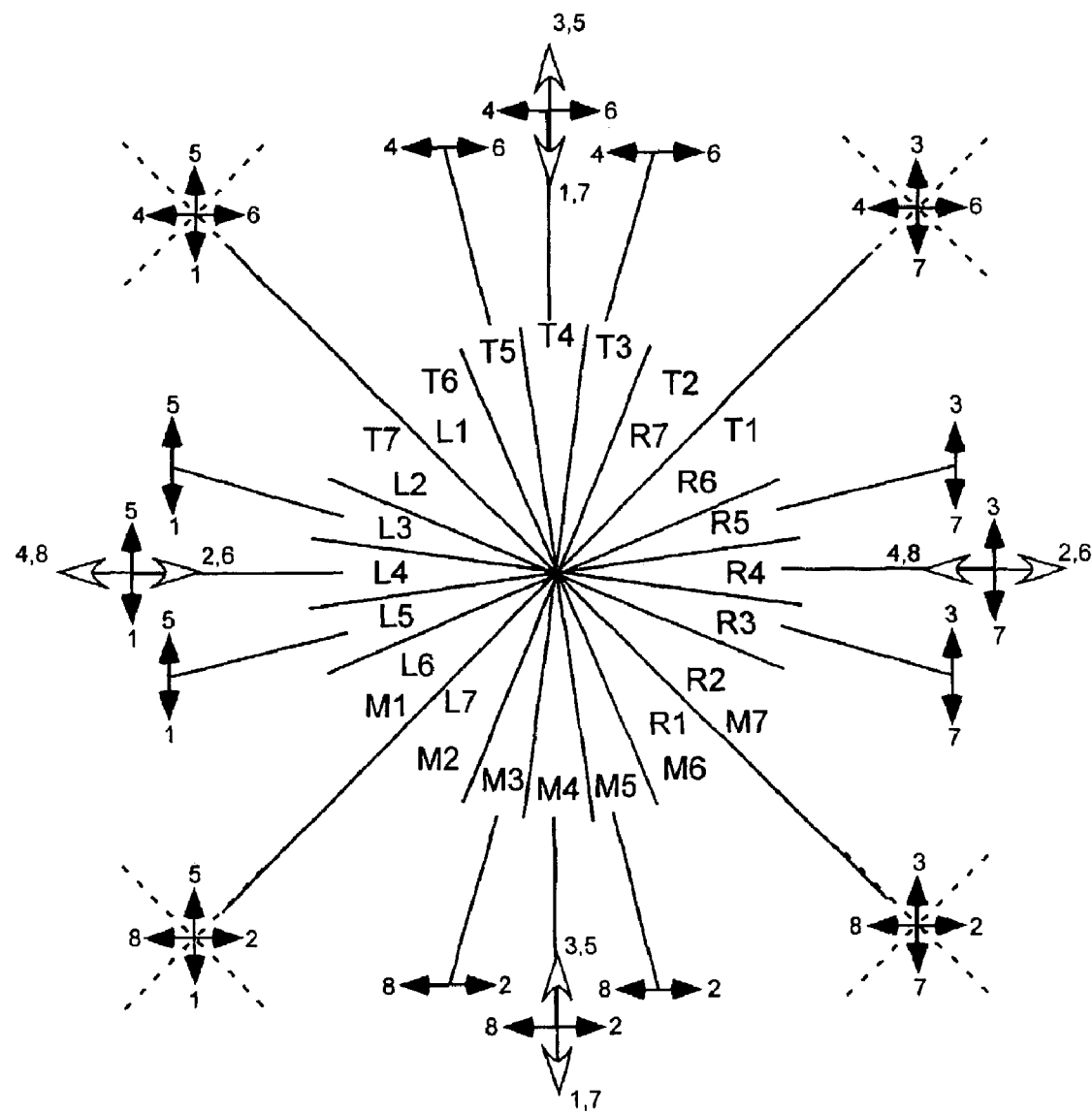
FIG. 17 is an illustration of approach vector directions.

The chart of FIG. 17 provides one way that the microprocessor 44 can evaluate ambiguous approach and touch vectors 80, 82. FIG. 17 shows the 360 degrees of possible directions of approach vectors 80. The possible directions are divided into left, right, top and bottom directions, denoted by the letters L, T, R and M. Each of the directions L, T, R and M is further subdivided into seven divisions. Each of the possible directions L, T, R and M overlaps with the adjoining directions. Considering the left direction as an example, an approach vector 80 in the L3, L4 or L5 directions strongly suggests that the user intends to move the finger 10 to the left side 8 of the imaginary rectangle 6. Motion in the direction of L1, L2, L6 or L7 is ambiguous, but the ambiguity may be resolved by considering the touch vector 82.

Figure 18:
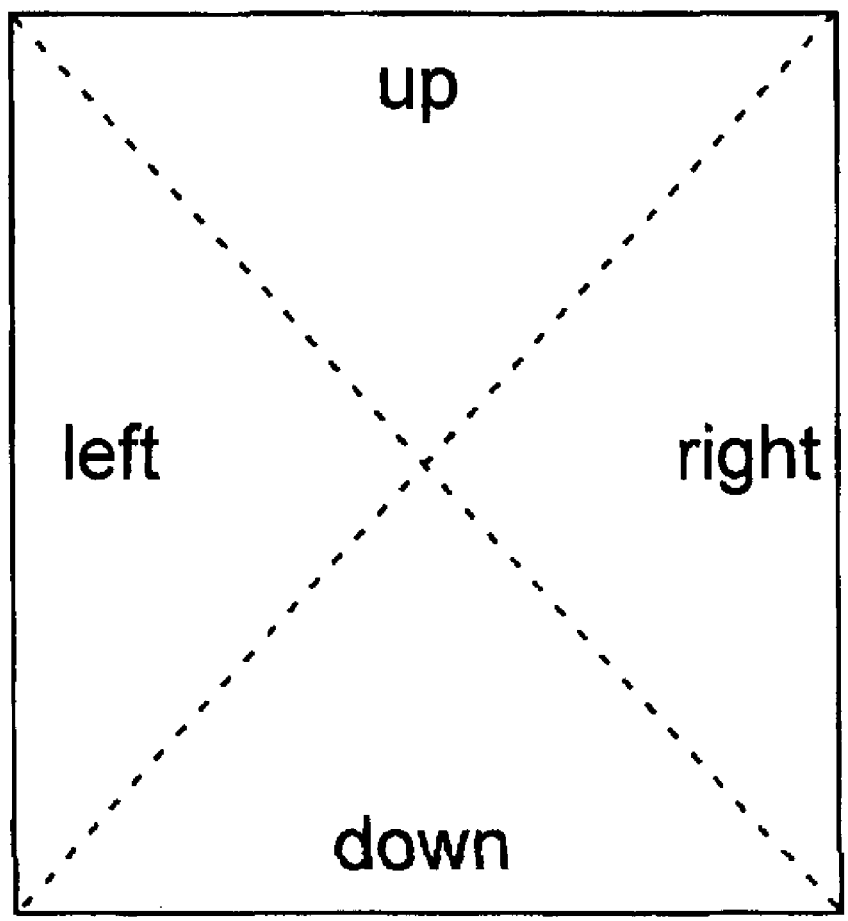
FIG. 18 is an illustration of touch vector directions.
Figure 19:
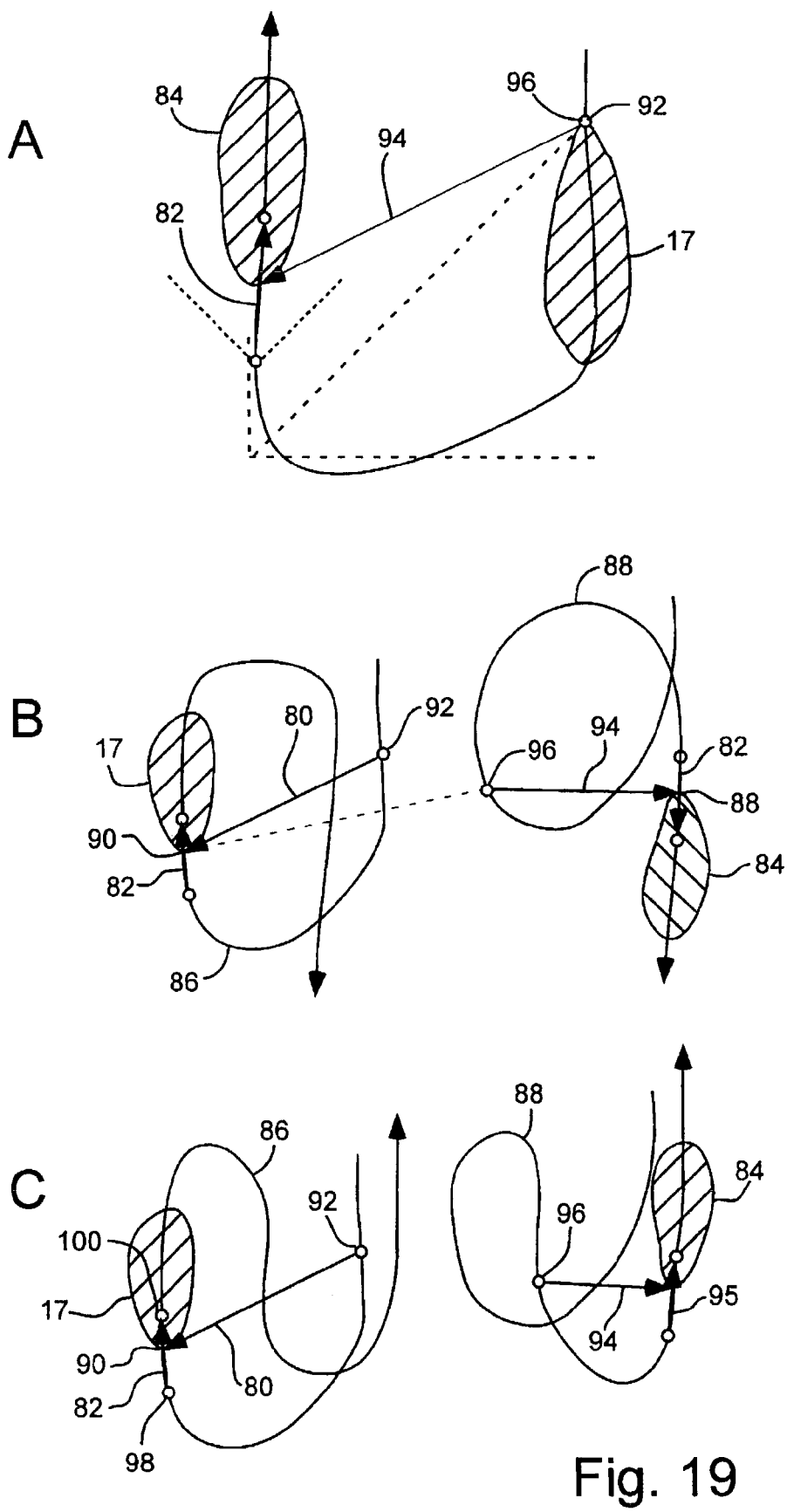
FIGS. 19A–C are diagrams showing determination of approach and touch vectors.

The touch vector 82 is determined by reference to FIG. 18 in combination with the approach vector 80. The starting point of the touch vector 98 is placed at the center of the diagonals of FIG. 18 and the touch vector 82 is therefore characterized as left, top, right or bottom. By way of example, a down touch vector 82 in combination with an otherwise ambiguous L7/M2 approach vector 80 unambiguously indicates that the user intended a counterclockwise motion 16 on the left side 8 of the rectangle 6 assigned to the finger. An up touch vector 82 in combination with the L7/M2 approach vector 80 unambiguously indicates that the user intended a clockwise motion 14 on the left side 8 of the rectangle 6. A left touch vector 82 coupled with same ambiguous L7/M2 approach vector 80 unambiguously indicates that the user intended a clockwise motion 14 on the bottom side 8 of the imaginary rectangle 6. A right touch vector 82 coupled with the ambiguous L7/M2 approach vector 80 unambiguously indicates that the user intended a counterclockwise motion 16 on the bottom side 8 of the imaginary rectangle 6.

Figure 20:
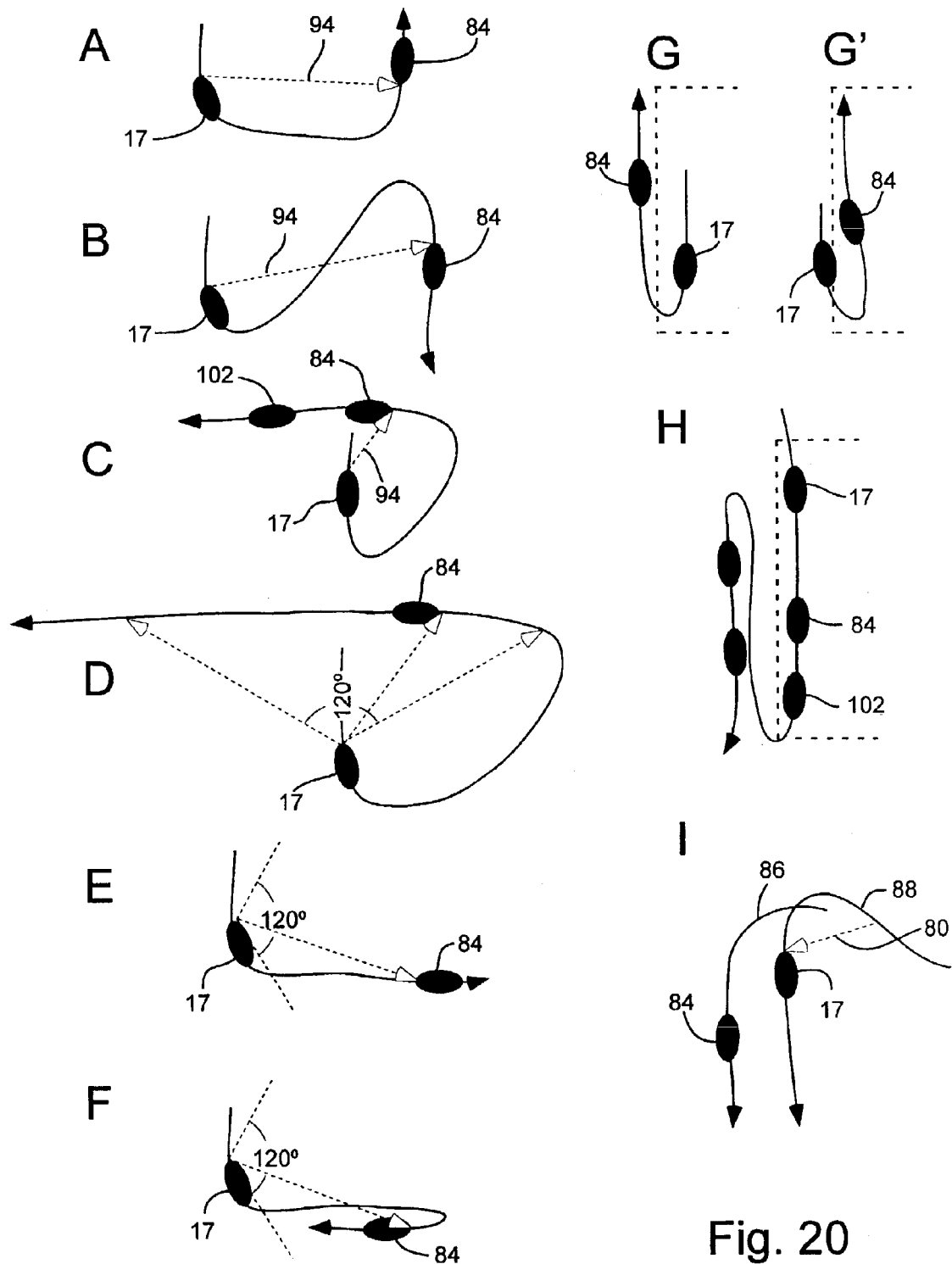
FIGS. 20A–I are diagrams showing determination of approach and touch vectors.

An additional ambiguity exists when and approach vector 80 in the L4 direction is coupled with a touch vector 82 in the left or right directions. As illustrated by FIG. 20C and as discussed below, this type of ambiguity is resolved by determining the beginning point 92 of the approach vector in relation to a previous encoding touch 17.

It is apparent that vector classification may be made more accurate by giving different weights to different angle ranges, according to the degree of confidence which may be associated with the particular range of approach or touch vectors 80, 82. Thus the potentially ambiguous ranges L1 and L7 in the above example may be assigned lower weights in resolving an ambiguous glance.

Touch vectors 82 falling too close to the diagonal lines of FIG. 18 dividing the touch vectors 82 into left, top, right and bottom may be rejected as too ambiguous to resolve. In such a case, either a warning sound may be emitted or an algorithm of range assignment based on other criteria may be employed.

FIG. 20A-I show several combinations of finger 10 motions from which the microprocessor 44 can infer approach and touch vectors 80, 82. FIG. 20A shows a first encoding touch 17 with a generally down touch vector followed by a horizontal approach vector 94 toward the right coupled with a second encoding touch 84 with an upward touch vector 95. Even having no data preceding the first encoding touch 17, the first encoding touch 17 may be unambiguously characterized by the microprocessor 44 as left approach vector 80/down touch vector 82 by its position in relation to the second encoding touch 84. FIGS. 20A and B demonstrate that relations between consecutive touches may be used to define both the following 84 as well as the preceding 17 encoding touch.

FIGS. 20C–F illustrate how the starting point 96 of an approach vector 94 for a second encoding touch 84 may be determined by a first encoding touch 17. FIG. 20C shows a first encoding touch 17 having a left approach vector 80 combined with a down touch vector 82 followed by a second encoding touch 84 having a top approach vector 94 and a left touch vector 95, which is further followed by a third encoding touch 102 in the same direction. The rapid repetition of the second 84 and third 102 encoding touches allows the microprocessor 44 to infer that the user intended to repeat the same symbol by defining the beginning point of the third encoding touch 102 by reference to the second encoding touch 84, since the second encoding touch 84 has well-defined position and direction. This case corresponds to direction L4 on FIG. 17. In this instance, the microprocessor 44 applies the approach vector 94 of the second encoding touch 84 to the third encoding touch 102.

FIGS. 20D, E and F shows that precision of finger 10 motion is not required to successfully encode an intended symbol. As shown by FIGS. 20D and 17, an approach vector 80 anywhere within a range of about 120 degrees allows the microprocessor 44 to infer the side 8 of the rectangle 6 intended by the user. The method of the Invention therefore is very forgiving, allowing the microprocessor 44 to correctly interpret rapid, imprecise glancing motions. FIGS. 20E and F show additional techniques that may be used to further reduce ambiguity. For example, the user's finger 10 may exaggerate the encoding motion to accentuate the desired direction.

FIGS. 20G and G' present an example of ambiguity where the approach vector 80 is shorter than the allowed minimum for an approach vector 80. The choice of lateral motion unambiguously defines a second encoding touch 84 performed along the same side 8 of the imaginary rectangle 6. In Fig. G, a first encoding touch 17 has a left approach vector 80 and a down touch vector 82. The user moves his or her finger 10 to be closer to the selected left side 8 and makes another encoding touch 84. The location of the second encoding touch 84 closer to the selected side 8 makes clear that the left side 8 is selected and prevents ambiguity. FIG. 20G' shows the same sequence, except that the user has failed to move the finger 10 closer to the selected side 8 for the second encoding touch 84. The microprocessor 44 incorrectly may infer that the user intends to move the finger 10 to the right side 8 of the rectangle 6, assigning the incorrect symbol to the second encoding touch of Fig. G'. Motion of the finger 10 in the direction of the selected side 8 avoids any ambiguity.

FIG. 20H is an example of a chain of glances where the user makes several encoding touches 17, 84, 102 in the same either X or Y direction. For such a chain of encoding touches, the microprocessor 44 defines the approach and touch vectors 94, 95 of all members of the group as being the same as the first encoding touch 17 in the series. This technique is used for inputting repeated symbols.

FIG. 20I illustrates time and effort saving technique where well defined position and direction of the first encoding touch 17 is transferred to the subsequent encoding touch 84 made along the same trajectory and in the same direction, even if the second encoding touch is by another finger. Two touches 17, 84 are performed by two different fingers in a rapid sequence within the same glancing sweep. Unlike in FIG. 19B the approach vector 94 for the touch 84 is shorter than the allowed minimum. Fortunately both fingers have well defined position and direction: left approach vector 80 and a down touch vector 82. The approach vector 80 for the first encoding touch 17 is applied to the second encoding touch 84.

These examples illustrate that different strategies of optimizing glances may be employed without sacrificing distinctness of encoding. Examples in FIG. 19 and FIG. 20 demonstrate the fluidity and great efficacy of glancing motions. As opposed to glancing, each motion required for operation of a chorded keyboard is followed by non-encoding release or repositioning motion, made in preparation for the next stroke. A Similar problem exists with the typewriter keyboard but is less severe because keystrokes are distributed among the 10 fingers. Contrary to the motions required for operation of a typewriter keyboard or chorded keyboard, glancing is performed with continuous sweep operation of low force, small amplitude high speed and with significantly reduced wasted motion.

Figure 21:
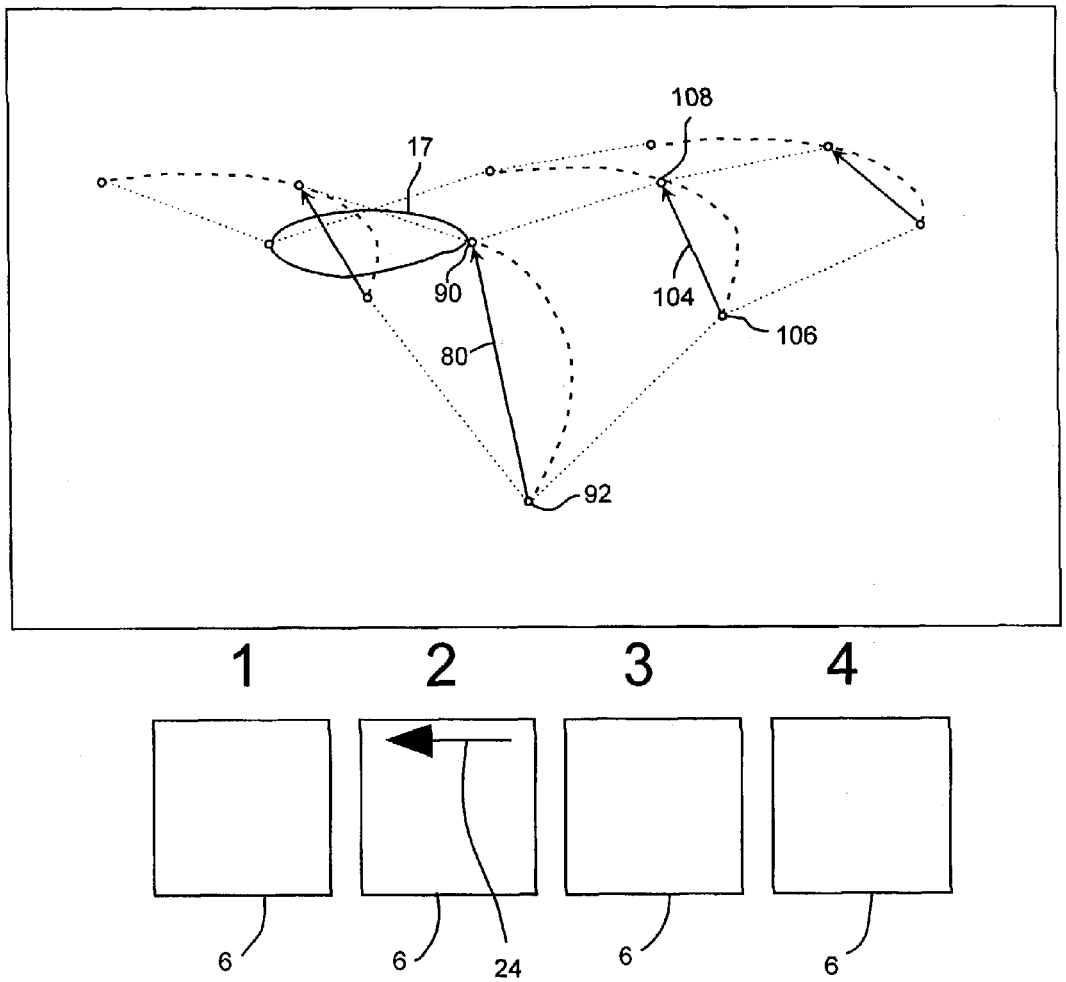
FIG. 21 shows approach vectors for multiple fingers.

FIG. 21 illustrates how the motion of several fingers 10 may be used to infer the motion of a single finger 10 making an encoding touch to determine an approach vector 80. The technique has particular application when the data defining the motion of the finger 10 making the encoding touch 17 is missing or ambiguous. In FIG. 21 the motions of four fingers 10 are shown. The four fingers 10 move in a similar manner due to the biomechanics of the hand 12. The user's second finger 10 makes the encoding touch 17. Starting and ending points 106, 108 for an approach vector 104 may be determined for some or all of the other fingers 10 during and prior to the encoding touch 17 by the second finger 10. One of the approach vectors 104 derived from user's other fingers 10 may be combined with the touch vector 80 for the finger 10 making the encoding touch 17 to determine the encoded symbol. For example, an approach vector 104 may be determined for user's ring finger 10 corresponding to an encoding touch 17 by user's middle finger 10. The ending point 108 of the approach vector 104 for user's ring finger 10 would be determined by the position of the ring finger 10 at the predetermined time with respect to the encoding touch 17 of the middle finger 10, and the beginning point 106 of the approach vector 104 would be determined by the location of the ring finger 10 at a predetermined time prior to the time of the ending point 108. Alternatively the microprocessor 44 may average the approach vectors 104 calculated for the other fingers 10 to arrive at an approach vector 80 for the encoding touch 17 by the second finger 10. The microprocessor 44 may correct for missing or ambiguous information by assigning typical Y-coordinate distances between a finger 10 making an encoding touch and other fingers 10.

The above description relating to the calculation of approach 80 and touch 82 vectors discusses one mechanism for inferring the intent of the user by the microprocessor. However, any mechanism that allows the microprocessor to infer the intent of the user according to the method described above based on finger 10 trajectories and touches as detected by a glance pad 4 may be used to decode finger 10 motion and touch information.

Figure 22:
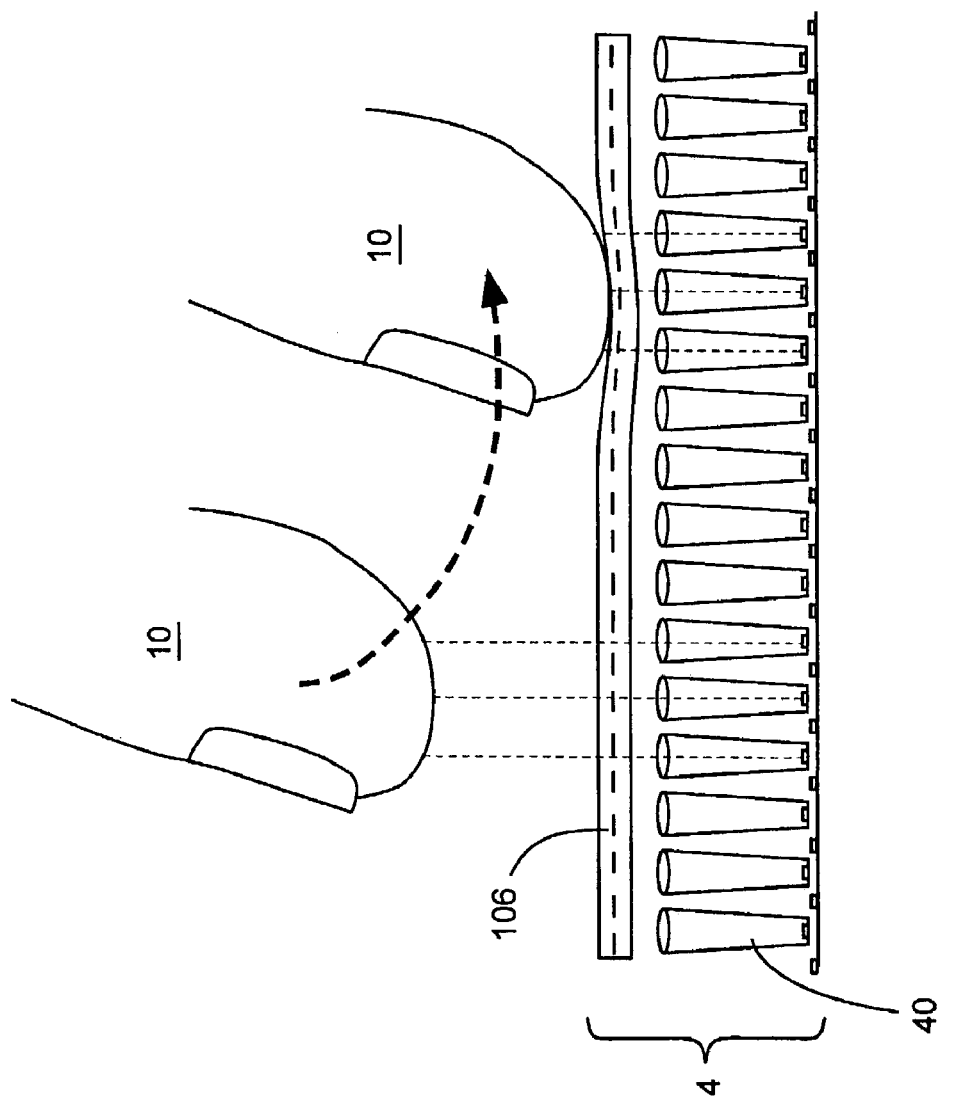
FIG. 22 shows an alternative glance pad embodiment.

FIG. 22 shows an alternative embodiment of a photocell glance pad 4. In the embodiment of FIG. 22, a transparent touch detecting layer 106 is added to the photocell glance pad 4. The photocells 40 are used to detect motion in proximity to the glance pad 4 and the touch detector 106 is used to detect touch. The touch detector 106 may use any suitable conventional technology. One possible technology comprises a grid of fine wires or other electrical conductors in the X and Y directions. Pressure of a finger 10 on the glance pad 4 presses the wires of the touch detector 106 in the X direction with wires in the Y direction, completing a circuit identifying the X and Y coordinates of the touch. The alternative embodiment glance pad 4 otherwise operates as described above.

Figure 23:
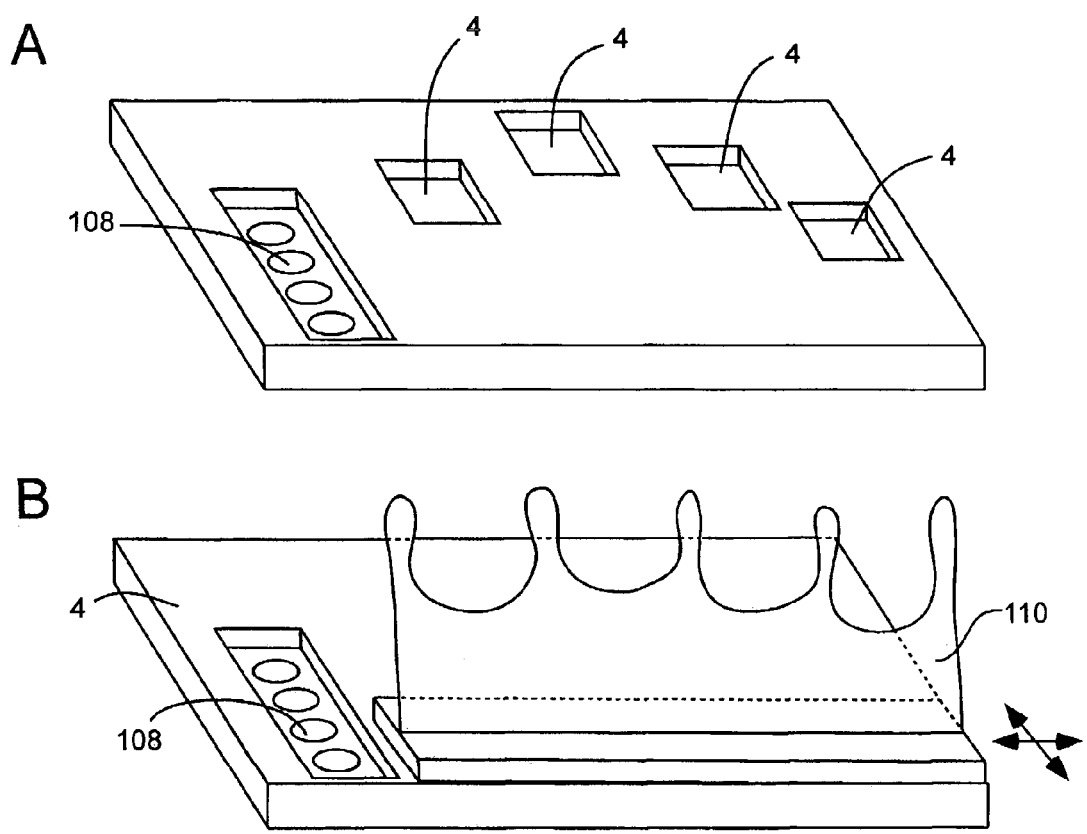
FIGS. 23A and B are alternative glance pad embodiments.

FIG. 23 shows two alternative embodiment glance pads. In FIG. 23A, each finger 10 of user is provided a separate glance pad 4, eliminating the need to for the glance pad 4 to electronically discriminate among the user's fingers 10. The user selects a finger 10 and makes an encoding touch 17 using the selected finger 10. The thumb operates controls 108 for the glance pad 4, such as selecting capital letters or selecting among alternative libraries of symbols 48.

FIG. 23B provides a mechanical slider 110 confining one or more fingers 10 of user. The mechanical slider 110 moves in the X and Y directions and defines the motion of the hand 12 of the user. The fingers 10 have freedom for flexion/extension motions without moving the slider 110, although the slider 110 may move along Y-axis with wrist motions. All information to discriminate among the fingers 10 and to determine hand 12 position to compute an approach vector 80 is supplied by the mechanical slider 110. The glance pad 4 is only required to detect and trace encoding touches 17 and hence is not required to detect the proximity of a finger 10. As a result, the glance pad 4 of FIG. 23B may utilize conventional touch-pad technology and may dispense with proximity-sensing technology.

FIGS. 24A and B show a mechanical embodiment of the invention. The hand 12 of user rests on a turntable 112. The position of turntable 112 notifies the apparatus as to which finger 10 is selected by user. The glance pad 4 has four switches 114 arranged in a rectangular area. Motion by a finger 10 of user against two of the four switches 114 defines the eight possible glance motions 18, 20, 22, 24, 26, 28, 30, 32 for each finger 10. The motion illustrated in FIG. 24B corresponds to an encoding touch 17 to the top of the rectangle 6 in a counterclockwise direction 16 by the third finger 10 of user, encoding the letter 't' using the example encoding schedule of FIG. 4. The rectangle 6 in the embodiment of FIGS. 24A and B is physical and is not imaginary. The selected fingertip 10 slides through two switches 114, in a motion parallel to the selected side 8 of the rectangle 6. The touch surface may comprise more than four switches 114, improving detection and resolution of encoding touches 17. Switches 114 may be mechanical, but preferably they are conventional zero force touch-activated switches.

Figure 25:
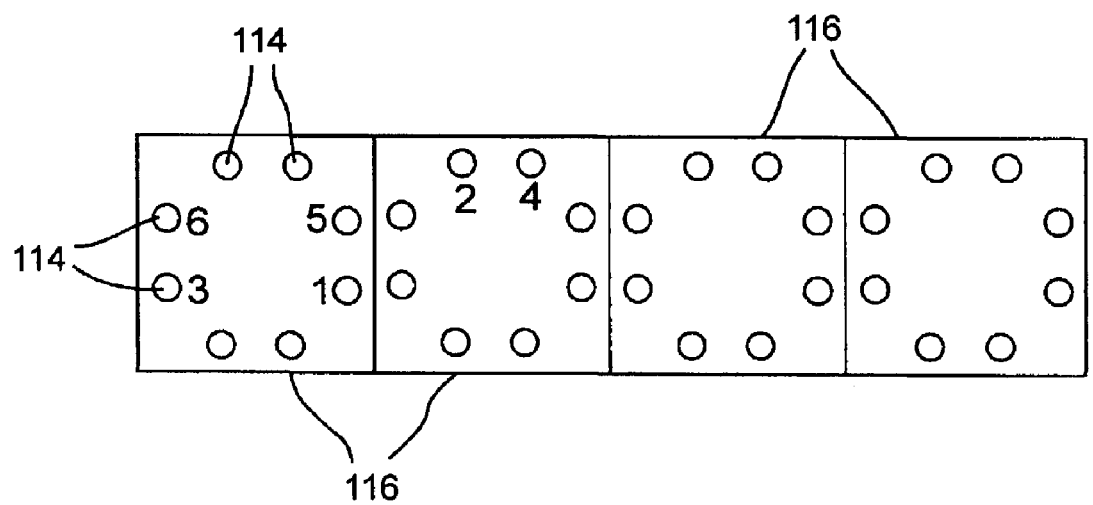
FIG. 25 is an alternative glance pad embodiment.

FIG. 25 shows a glance pad 4 having four switch pads 116, each for one finger 10. Each switch pad 116 has eight switches 114, two along each side of each switch pad 116. Each switch pad corresponds to a rectangle 6 and each of the sides of the switch pads corresponds to a side 8 of the rectangle 6. One of the two switches 114 along each side 8 of each rectangle 6 is used to indicate the clockwise direction 14, and the other of the two switches 114 along each side 8 is used to indicate the counterclockwise direction 16. To encode a symbol, the user selects a finger 10, selects the side 8 of the rectangle 6, and selects the clockwise 14 or counterclockwise 16 direction encoding the symbol. The user then activates the switch 114 corresponding to the selected finger 10, selected side 8 and selected direction 14, 16. Another encoding motion, such as a sweeping motion of a finger 10 along a side of the switch pad 116 that activates two switches in succession is also allowed, where the order of switches activated by such sweep encodes the direction. There is no need to calculate an approach vector 80 or a touch vector 82 using the apparatus of FIG. 25 because all information necessary to determine the intent of the user is supplied by the choice of the switch 114 by the user.

The apparatus and method of the Invention do not substitute for a computer 'mouse' and do not determine the location of a cursor on a computer monitor. However, a glance pad 4 may be configured to act selectably as a conventional touch screen to control the location of a cursor.

For the purpose of this application, the term "identifying a polygon" means that a user conceives of a polygon, such as imagining that a polygonal area exists on the surface of a glance pad, or perceives a polygon, such as observing or touching indicia indicating the location of a polygon on the surface of a glance pad.

In describing the above embodiments of the invention, specific terminology was selected for the sake of clarity. However, the invention is not intended to be limited to the specific terms so selected, and it is to be understood that each specific term includes all technical equivalents that operate in a similar manner to accomplish a similar purpose.

RAMIFICATIONS

The general operating rule of glancing is straightforward, and may be conveyed in simple instruction such as: "place a clockwise or counterclockwise glancing motion at the one of four sides of an imaginary square". Glancing motions may be expected to be clumsy at first, and slow. But like learning to play a piano or a violin, glances will become fast and precise, especially because they are based on the most natural motor predispositions of the hand. With growing user's experience, an instinctive purposefulness and efficacy of glances emerges, greatly improving with further training. With training the glancing patterns are faster, more accurate and attain smaller amplitude.

All this is possible because transitions between different encoded symbols are smooth and motion efficient. The rectangular polygon chosen as the glance pad template results from the selection of glancing motions that are the most compatible with the human hand. As in skilled handwriting, expert glancing motions form smooth, convoluted trajectories and thus the code recognition algorithms preferably are tolerant of trajectory variations. The apparatus and method of the Invention is quite tolerant of finger motion inaccuracies, and allows the user a wide range of finger motions.

The glance pad is easily adaptable to difficult operating conditions, which may require larger amplitude movement and a stronger pressure. If movements are of large amplitude the wrist and the whole arm may participate in glancing motions to a greater extent. It is the advantage of the optical glancing pad that motions may be scaled up or down at any time, according to the conditions, and adjusting to the needs of the user.

Figure 26:
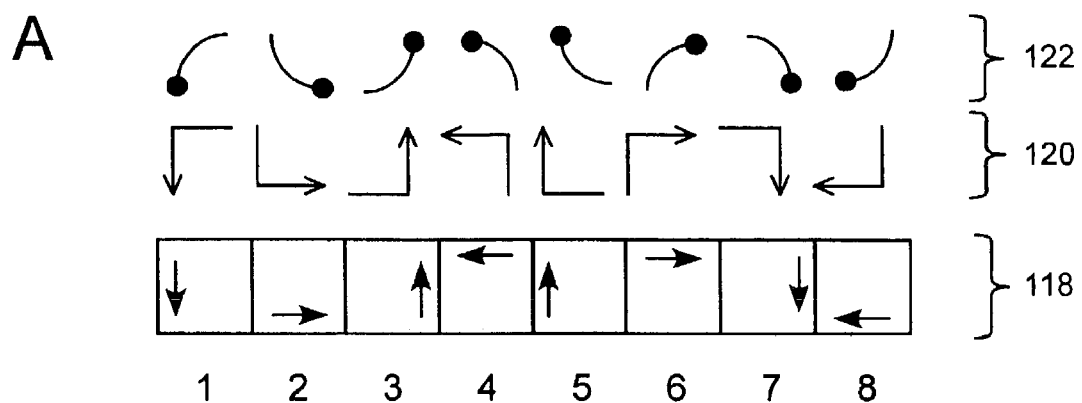
FIG. 26A-D show alternative methods of glance communication.
Figure 26:
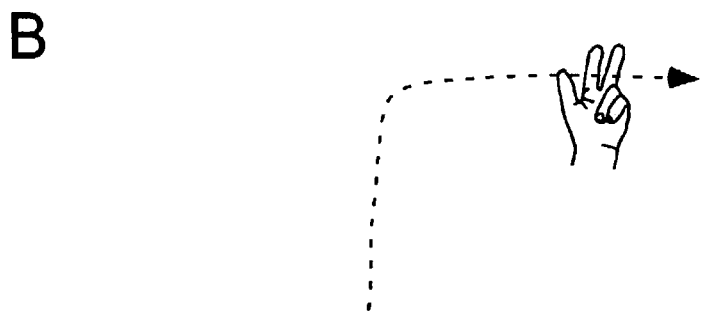
Figure 26:
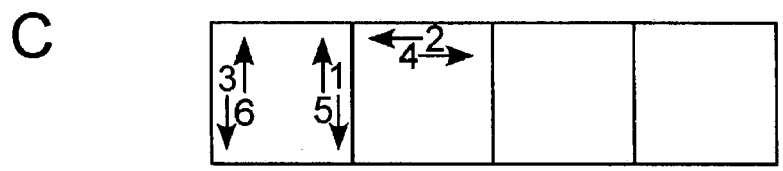

FIG. 26A shows three symbolic glance notations. "Arrow in a square" notation 118 is when touch motion is indicated along the selected side of a physical square. When there is no square, both the approach motion and the touch motion have to be specified to properly encode a glance. This aspect of glancing is represented using the squared arrow 120 and a deflected arrow 122 notation, where the shape of the arrow uniquely defines the approach motion. These three notations are useful not only for writing glances, but may have a more practical use. For example square arrow notation 120 may be used for making glancing motions "in the air". In FIG. 26B such motion indicating the use of the third finger is performed along the trajectory indicated by the dashed arrow, and encodes a letter 'v'.

An 'arrow in the square' notation 118 may have another important use. A complete set of glancing motions may be produced with the use of only one finger on a device with four-section touch pad, in fact the whole arm, other body parts (e.g. tongue), or some tools may be used. The motion of a finger would indicate the one of four squares, and a position and direction of a glance. FIG. 26C illustrates such use, wherein the numbers alongside arrows indicate the order in which glances occurred. The word encoded by the encoding touches indicated on FIG. 26C is 'glance' using the symbol assignment of FIG. 4. As it becomes apparent, glances may also be performed by a person with some degree of hand incapacity, e.g. with some fingers missing, at the cost of reduced speed. Based on such principle devices which are tongue or eye motions operated may be used for glance encoding. Such technique may allow people with quadriplegia to communicate using glances. Glances may be also distributed between the two hands. Finally, glances can be written (and eventually read), with any of common use writing devices, such as a pencil, typewriter or a printer in a manner demonstrated in FIG. 26D.

CONSTRUCTION

The pad 4 may have a smooth surface or be rough, have a texture, have stiff or soft, finger compliant surface, or may be generating touch enhancing vibrations. It may be flat or be shaped to enhance performance, e.g. having surface convex along its length.

The pad 4 may be mounted onto an enclosure of varied shape and size, also housing the electronic circuitry, together with sockets, connectors and switches. The enclosure may be built for stationary table-top use, or for portable use. Glance pad 4 may be an integral part of the enclosure, or may be of a wearable type, and in such case it may be flat, and thin, or the whole enclosure with the pad may be of wearable type.

Motion trajectory may have other identifying features, such as curvature, and thickness reflecting e.g. the distance from the pad 4. Such features may be useful to supplementally define the glance. The pad 4 may additionally reproduce the force of touch at each node.

Microprocessor 44 in more advanced implementations is able to resolve ambiguous detections, by performing data analysis of a broader scope, such as utilizing duration, shape and area of the encoding touch 17, and the touch force. If a spurious finger 10 contact occurs, the microprocessor 44 should be able to optimize detection by using pre-set criteria for inclusion/elimination of data, such as selecting the longest lasting glance, or accepting only the earliest of near-simultaneous touches or rejection of contextually unusual symbols. Also it is envisioned, that semantic analysis of produced verbal data would provide advanced intelligent choices, thus helping to eliminate other possible types of erroneous entries.

Alignment of pad's axes with the direction of the forearm is required in implementations presented here, as glance trajectories relate to the length and width of the pad. With appropriate software algorithms the pad 4 may be made self-aligning to properly read the orientation of detected motions.

Figure 24:
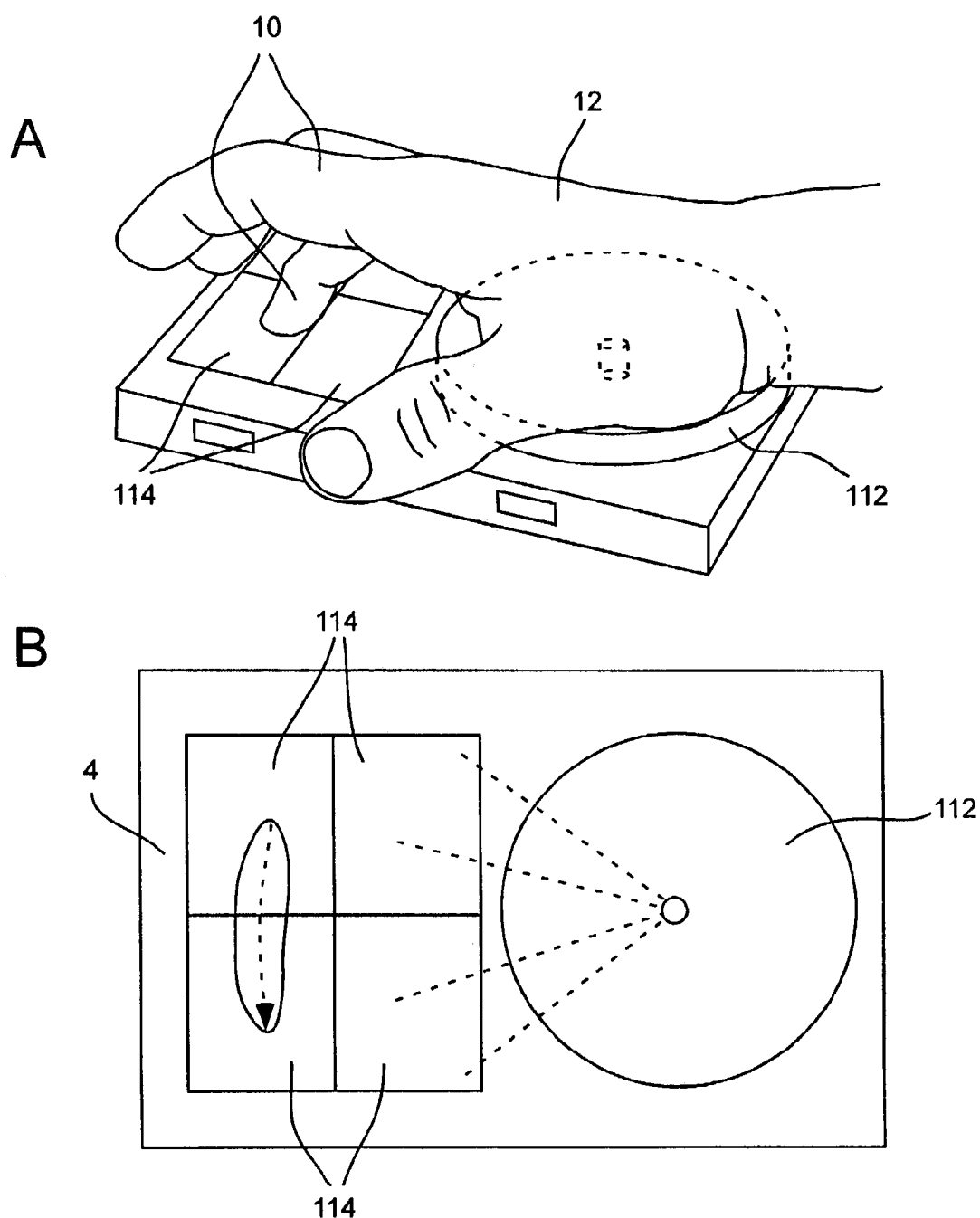
FIG. 24 is an alternative glance pad embodiment.

There are other designs possible in addition to embodiments mentioned above. Even simpler construction of the glance encoder to the one which is shown on FIG. 24 is using similar multi-sectioned pad, where the top surface of each section is electrically conductive. The turntable is eliminated and each fingertip 10 is equipped with a separate electrical conductor. That way each touching finger produces different electrical circuit with conductive sections of the pad, thereby identifying the finger 10 while encoding the direction and the position of touch within the same operation.

Glance detection may be also accomplished with other attachments to fingertips 10. Such attachments may help to discriminate between fingers 10 by marking them uniquely (e.g. by equipping each with tuned inductive elements, magnets, reflective patterns, color, reflectance enhancing surfaces or devices, electrical conductors, etc.). Such implements may also increase the range and resolution of distance detection, and may simplify the glance detecting device construction.

Important feature of glance pad 4 implementations presented in the above specification is that glance pad 4 construction and settings should be fitted and adjusted to actual conditions of its use. Every embodiment presented here should be used under the condition for which it offers the best service.

UTILITY

The device proposed here is a perfect supplement to wearable computers, especially these equipped with screen-goggles, thus making the computing a totally new experience: portable, more enjoyable and more productive.

Glance-pad 4 may be attached to the arm, on clothes or anywhere in conveniently hand-accessible locations. Glanced message is recorded as easy as voice is taped, but it does not produce noise and is impervious to noise.

Glancing motions reflect motor features which are as unique and easily identifiable as fingerprints. Also motor habits, timing of motions and distances between fingertips are fixed for the particular user. Glance-pad 4 software should incorporate means for recognizing these individual glancing peculiarities, which may be used for the purpose of identifying the person e.g. for security reasons.

CONCLUSION

Prior art communication using hand motions depended on mechanical devices for motion encoding. The goal of the present proposal is to liberate the encoding motions of constraints imposed by the motion encoding devices. Operation of a glance pad 4 is not as constrained by the motion recording device as is a typewriter keyboard or chorded keyboard. As a result the glance pad 4 may be operated with speed and instinctive effortlessness reminiscent of the speech, and the hand may be used to perform other actions in addition to operating the glance pad 4. The pad 4 can be operated unimpeded by various life activities, even such extreme activities as walking, running, driving a car or riding a bicycle.

By producing communication more intuitively, glance pads 4 may be especially suited for interchange of information between people. It may have a role as a versatile interface between the human mind and the outer world, supplementing speech, gestures, writing, and certainly replacing keyboards.

A glance pad 4 produces code that is less ambiguous than spoken letters, may be converted into any communicable format, and may be instantly recorded without loss or degradation to the contents. As an example, a message produced by a glance pad 4 may be presented as visually readable text, as computer generated speech, or as binary data ready for the cable or tele-transmission. Communication generated by a glance pad 4 could be used as an alternative to spoken languages. Furthermore, such a system may generate real time foreign language speech output, allowing for natural full-speed conversation among speakers of different languages, where each person may send vocal messages in the receiver's native tongue. Such use may have a great and positive cultural implication, by promoting unification and understanding among the peoples of the world.

I claim:

1. A method of communicating symbols by a user, the method comprising:
   a. identifying a polygon having a first side;
   b. associating a first direction with said first side, said first direction having a predetermined relationship with said first side, said predetermined relationship between said first direction and said first side of said polygon comprising said first direction being selected from the list consisting of a generally clockwise direction with respect to said polygon and a generally counterclockwise direction with respect to said polygon;
   c. associating one of the symbols with said first direction and said first side;
   d. making by the user of an encoding motion, said encoding motion indicating said first direction and said first side, thereby communicating the symbol associated with said first direction and first side.

2. The method of claim 1 wherein said predetermined relationship between said first direction and said first side of said polygon further comprising said first direction being generally contiguous with said first side.

3. A method of communicating symbols by a user, the method comprising:
   a. identifying a polygon having a first side;
   b. associating a first direction with said first side, said first direction having a predetermined relationship with said first side;
   c. associating one of the symbols with said first direction and said first side;
   d. making by the user of an encoding motion, said encoding motion indicating said first direction thereby communicating the symbol associated with said first direction and said first side, said predetermined relationship between said first direction and said first side of said polygon comprising said first direction being generally contiguous with said first side, said predetermined relationship between said first direction and said first side of said polygon further comprising said first direction being selected from the list consisting of a generally clockwise direction with respect to said polygon and a generally counterclockwise direction with respect to said polygon.

4. The method of claim 3 wherein said encoding motion is a first directional motion, said first directional motion indicating said first direction by being generally contiguous with said first direction.

5. A method of communicating symbols by a user, the method comprising:
   a. identifying a rectangular polygon having a first side, a second side, a third side and a fourth side;
   b. associating a first direction and a second direction with each of said first, second, third and fourth sides, said first direction and said second direction having a predetermined relationship with said first, second, third and fourth sides;
   c. associating one of the symbols with each of said first direction and said second direction for each of said first, second, third and fourth sides;
   d. determining a location of said polygon, said polygon location being defined by a position of a finger of the user at a predetermined time;
   e. making by said finger of the user of an encoding motion subsequent to said predetermined time, said encoding motion indicating one of said first and second directions for one of said first, second, third and fourth sides, thereby communicating the symbol associated with said one of said first and second directions and said one of said first, second, third, and fourth sides.

6. The method of claim 5 wherein said predetermined relationship between said first and second directions and said first, second, third or fourth sides of said rectangular polygon comprising said first direction and said second direction being generally contiguous with said first, second, third, or fourth sides of said rectangular polygon.

7. A method of communicating symbols by a user, the method comprising:
   a. identifying a rectangular polygon having a first side, a second side, a third side and a fourth side;
   b. associating a first direction and a second direction with each of said first, second, third and fourth sides, said first direction and said second direction having a predetermined relationship with said first, second, third and fourth sides;
   c. associating one of the symbols with each of said first direction and said second direction for each of said first, second, third and fourth sides;
   d. making by the user of an encoding motion, said encoding motion indicating one of said first and second directions for one of said first, second, third and fourth sides, thereby communicating the symbol associated with said one of said first and second directions and said one of said first, second, third, and fourth sides, said predetermined relationship between said first and said second directions and said first, second, third and fourth sides of said rectangular polygon comprising said first direction and said second direction being generally contiguous with said first, second, third, or fourth sides of said rectangular polygon, said predetermined relationship between said first direction and said second direction and said first, second, third and fourth sides of said rectangular polygon further comprising said first direction being one of a generally clockwise direction and a generally counterclockwise direction with respect to said rectangular polygon, and said second direction being the other of said generally clockwise direction and said generally counterclockwise direction with respect to said rectangular polygon.

8. The method of claim 7 wherein said encoding motion is a directional motion, said directional motion indicating one of said first and second directions for one of said first, second, third and fourth sides by being generally contiguous with said one of said first and second directions for one of said first, second, third and fourth sides.

9. The method of claim 8, the user making said encoding motion using a body part.

10. The method of claim 9, said body part being one of a plurality of fingers of the user.

11. The method of claim 10 wherein the user making said encoding motion in relation to a glance pad.

12. The method of claim 11 wherein said polygon being one of a plurality of rectangular polygons, the method further comprising:
  a. identifying others of said plurality of rectangular polygons, each of said others of said plurality of rectangular polygons having a first side, a second side, a third side and a fourth side,
  b. associating said first direction and said second direction with each of said first, second, third and fourth sides of each of said others of said plurality of polygons;
  c. associating one of the symbols with each of said first direction and said second direction for each of said first, second, third, and fourth sides of each of said others of said plurality of polygons;
  d. said encoding motion indicating one of said first or said second directions with respect to said first, second, third or fourth sides of one of said others of said plurality of polygons, thereby communicating the symbol associated with said indicated first or second direction, said indicated first, second, third or fourth side and said indicated one of said others of said plurality of polygons.

13. The method of claim 12 wherein said finger being one of a plurality of fingers of user, the method further comprising:
  a. identifying others of said plurality of fingers of the user;
  b. assigning one of said others of said plurality of rectangular polygons to each of said others of said plurality of fingers of the user.

14. The method of claim 13 further comprising: tracking of each of said plurality of fingers with respect to a glance pad.

15. A method of encoding symbols, the method comprising:
  a. tracking a first motion in relation to a glance pad;
  b. determining a trajectory of said first motion with respect to said glance pad, the step of determining said trajectory of said first motion comprising determining an approach vector based on said first motion and determining a touch vector based on said first motion;
  c. selecting one of the symbols from a library of symbols, said selected one of the symbols corresponding to said trajectory of said first motion, thereby encoding said selected one of the symbols.

16. The method of claim 15 wherein said step of selecting one of the symbols from a library of symbols comprises selecting the symbol corresponding to said approach vector and said touch vector.

17. The method of claim 16 wherein said touch vector is determined by a direction of said first motion during a first period of time, said first period of time being determined by a first predetermined criteria relating to an encoding touch to said glance pad.

18. The method of claim 17 wherein said approach vector is determined by a direction of said first motion during a second period of time, said second period of time being determined by a second predetermined criteria relating to said encoding touch to said glance pad.

19. The method of claim 16 wherein said first motion is a first finger motion of a user and said encoding touch is a first finger encoding touch, said first finger encoding touch being by said first finger of said user to a surface of said glance pad.

20. The method of claim 19 wherein said approach vector is defined by a beginning point and an ending point, said beginning point being determined by said first finger motion at a beginning time, said ending point being determined by said first finger motion at an ending time, said ending time being determined in relation to a time of said first finger encoding touch to said glance pad.

21. The method of claim 20 wherein said beginning time is a predetermined time prior to said time of said first finger encoding touch to said glance pad.

22. The method of claim 20 wherein said beginning time is determined in relation to a prior encoding touch.

23. The method of claim 19 further comprising: tracking a second finger motion with respect to said surface of said glance pad.

24. The method of claim 23 wherein said approach vector is defined by a beginning point and an ending point, said ending point determined by said second finger motion at an ending time, said ending time being determined in relation to said time of said first finger encoding touch to said glance pad, said beginning point being determined by said second finger motion a predetermined time prior to said first finger encoding touch.

25. The method of claim 19 further comprising: tracking a plurality of finger motions with respect to said surface of said glance pad.

26. The method of claim 25 wherein said approach vector is defined by a beginning point and an ending point, said beginning point being determined by said plurality of finger motions.

27. An apparatus for communicating symbols by a user, the apparatus comprising:
  a. a glance pad, said glance pad being adapted to detect a motion by the user with respect to said glance pad;
  b. a glance pad signal generated or modified by said glance pad in response to said motion by the user;
  c. a microprocessor operably connected to said glance pad, said microprocessor adapted to receive said glance pad signal and to determine a trajectory of said motion based on said glance pad signal, said trajectory comprising an approach vector and a touch vector;
  d. a memory accessible to said microprocessor;
  e. a library of symbols residing in said memory, said symbols in said library being selectable by said microprocessor based upon said trajectory;
  f. an output adapted to transmit a symbol selected by said microprocessor from said library.

28. The apparatus of claim 27 wherein said motion that said glance pad is adapted to detect includes a proximity motion and an encoding touch.

29. The apparatus of claim 28 wherein said microprocessor is adapted to determine said touch vector by determining a direction of said motion in relation to a time of said encoding touch.

30. The apparatus of claim 29 wherein said microprocessor is adapted to determine said approach vector by determining a beginning point and an ending point, said ending point being determined by said motion in relation to said time of said encoding touch to said glance pad.

31. The apparatus of claim 30 wherein said beginning point is determined by said motion by said user at a predetermined time prior to said time of said encoding touch to said glance pad.

32. The apparatus of claim 30 wherein said beginning point is determined by said motion by said user in relation to a prior touch ending point.

33. The apparatus of claim 30 wherein said motion is a plurality of finger motions of each of a plurality of fingers of the user.

34. The apparatus of claim 33 wherein:
   (a) said library comprises a plurality of directories of symbols, each of said plurality of directories of symbols being assigned to one of said plurality of fingers of the user;
   (b) said microprocessor being adapted to distinguish among said plurality of finger motions and to identify one of said plurality of fingers associated with said encoding touch;
   (c) said microprocessor selecting one of said plurality of directories based upon said one of said plurality of fingers associated with said encoding touch.

35. The apparatus of claim 27 wherein said adaptation of said glance pad to detect said motion being selected from the list consisting of mechanical switch, resistive membrane, acoustic sensors, capacitive sensors, inductive sensors and optical sensors and any combination thereof.

36. An apparatus for encoding a symbol, the apparatus comprising:
   (a) a glance pad, said glance pad having a surface;
   (b) means to detect a location of a touch to said surface by an object at an initial time;
   (c) means to detect a change in said location of said object touching said surface subsequent to said initial time, said location of said touch to said surface by said object at said initial time and said change in said location of said object touching said surface subsequent to said initial time defining a touch vector;
   (d) means to detect a change in said location of said object during a period prior to said initial time, said object being proximal to but not touching said surface during said period, said change in location of said object proximal to said surface during said period prior to said initial time defining an approach vector;
   (e) means to choose the symbol from a directory based on said touch vector and said approach vector.

37. An apparatus for encoding a symbol, the apparatus comprising:
   (a) a glance pad, said glance pad having a touch surface;
   (b) location means adapted to detect a location of a touch to said touch surface at an initial time;
   (c) motion means adapted to detect a change in said location of said touch to said touch surface subsequent to said initial time;
   (d) one or more directories;
   (e) directory selection means adapted to select among said one or more directories;
   (f) symbol choosing means adapted to choose the symbol from said directory selected by said directory selection means based on said location of said touch at said initial time as determined by said location means and said change in location of said touch after said initial time as determined by said motion means;
   (g) said glance pad having a plurality of touch surfaces;
   (h) said location means being adapted to detect a location of said touch to one of said plurality of said touch surfaces at said initial time;
   (i) said motion means being adapted to detect said change in said location of said touch to said one of said touch surfaces subsequent to said initial time;
   (j) said directory selection means comprising said user selecting among said plurality of touch surfaces.

38. The apparatus of claim 37 wherein each of said plurality of said touch surfaces is assigned to one of a plurality of fingers of said user and said user selecting among said plurality of touch surfaces comprises said user selecting one of said plurality of fingers.

39. The apparatus of claim 38 wherein said first touch is by a finger of a user to said touch surface, said directory selection means comprising a user-selectable switch.

40. The apparatus of claim 41 wherein said user-selectable switch is activated by a position of a hand of said user.

41. The apparatus of claim 40 wherein said user-selectable switch is activated by a lateral motion of said hand of said user.

42. The apparatus of claim 41 wherein said user-selectable switch is activated by a rotary motion of said hand of said user.

43. A method of encoding a symbol, the method comprising:
   a. determining an initial time, said initial time being defined in relation to a time of an initiation of an encoding touch of an object to a surface;
   b. determining an approach vector, said approach vector being defined by an approach vector beginning point and an approach vector ending point, said approach vector beginning point being determined by a location of said object at an approach vector beginning time, said approach vector beginning time being a predetermined period of time prior to said initial time, said approach vector ending point being determined by a location of said object at an approach vector ending time, said approach vector ending time occurring subsequent to said approach vector beginning time, said approach vector having an approach vector direction of from 0 to 360 degrees, inclusive;
   c. determining an touch vector, said touch vector being defined by a touch vector beginning point and a touch vector ending point, said touch vector ending point being determined by a location of said object at a touch vector ending time, said touch vector ending time being a predetermined period of time after said initial time, said touch vector beginning point being determined by a location of said object at an touch vector beginning time, said touch vector beginning time occurring prior to said touch vector ending time, said touch vector having an touch vector direction of from 0 to 360 degrees, inclusive;
   d. comparing a combination of said approach vector direction and said touch vector direction to predetermined selection criteria, said predetermined selection criteria including an association of the symbol with said combination of said approach vector direction and said touch vector direction, thereby encoding the symbol.

44. The method of claim 43 wherein said object does not touch said surface at said approach vector beginning time and said object touches said surface at said touch vector ending time.

45. The method of claim 47, said step of comparing a combination of said approach vector direction and said touch vector direction to said predetermined criteria further comprising: interrogating a database, said database including said association of the symbol with said combination of said approach vector direction and said touch vector direction.

46. The method of claim 43, said step of comparing a combination of said approach vector direction and said touch vector direction to said predetermined criteria further comprising:
   a. assigning an approach angle group to said approach vector based on said approach vector direction, said approach angle group being selected from a universe consisting of left, right, top and bottom approach angle groups;
   b. assigning a touch angle group to said touch vector based on said touch vector direction, said touch angle group being selected from a universe consisting of left, right, top and bottom touch angle groups;
   c. comparing a combination of said approach angle group and said touch angle group to said database, said association of the symbol and said combination of said approach vector direction and said touch vector direction comprising an association in said database of the symbol and said combination of said assigned approach angle group and said assigned touch angle group, thereby inferring an intent of a user to select a side of a polygon and inferring an intent of a user to select a direction with respect to said side of said polygon.

47. The method of claim 46, said step of assigning said approach angle group further comprises: assigning said approach angle group based on a combination of said touch vector direction and said approach vector direction when said approach vector direction alone is ambiguous.

* * * * *

UNITED STATES PATENT AND TRADEMARK OFFICE
CERTIFICATE OF CORRECTION

| | |
|---|---|
| PATENT NO. | : 7,038,659 B2 |
| APPLICATION NO. | : 10/393421 |
| DATED | : May 2, 2006 |
| INVENTOR(S) | : Janusz Wiktor Rajkowski |

It is certified that error appears in the above-identified patent and that said Letters Patent is hereby corrected as shown below:

Column 26, line 17, the reference to claim "41" should be claim --39--.

Column 26, line 65, the reference to claim "47" should be to claim --44--.

Column 5, line 3 through Column 5, line 5, cancel the text beginning "FIG. 14A" an ending with "in the X and Y dimensions".

Signed and Sealed this

Sixteenth Day of January, 2007

JON W. DUDAS
*Director of the United States Patent and Trademark Office*